(12) United States Patent
Douady-Pleven et al.

(10) Patent No.: US 9,659,349 B2
(45) Date of Patent: May 23, 2017

(54) COLOR FILTER ARRAY SCALER

(71) Applicant: GoPro, Inc., San Mateo, CA (US)

(72) Inventors: Bruno Cesar Douady-Pleven, Gif-sur-Yvette (FR); Michael Serge André Kraak, Cachan (FR); Guillaume Matthieu Guerin, Paris (FR); Thomas Nicolas Emmanuel Veit, Meudon (FR)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 15/081,677

(22) Filed: Mar. 25, 2016

(65) Prior Publication Data

US 2016/0364841 A1    Dec. 15, 2016

Related U.S. Application Data

(60) Provisional application No. 62/174,786, filed on Jun. 12, 2015, provisional application No. 62/268,687, filed on Dec. 17, 2015.

(51) Int. Cl.
```
G06T 3/40     (2006.01)
G06T 5/00     (2006.01)
G06T 5/40     (2006.01)
H04N 9/77     (2006.01)
H04N 9/64     (2006.01)
```
(Continued)

(52) U.S. Cl.
CPC ............ *G06T 3/4015* (2013.01); *G06T 5/004* (2013.01); *G06T 5/009* (2013.01); *G06T 5/40* (2013.01); *H04N 5/213* (2013.01); *H04N 5/217* (2013.01); *H04N 9/646* (2013.01); *H04N 9/77* (2013.01); *H04N 9/735* (2013.01); *H04N 2209/046* (2013.01)

(58) Field of Classification Search
CPC ... G06T 15/205; G06T 7/0051; G06T 7/0065; G06T 7/0077; G06T 7/0075; G06T 5/005; G06T 2207/10028; G06T 2207/10024; G06T 3/4038; G06T 11/60; H04N 1/3876; H04N 5/23238; G06K 2009/2045
See application file for complete search history.

(56) References Cited

U.S. PATENT DOCUMENTS

2003/0085906 A1    5/2003  Elliott et al.
2005/0088385 A1    4/2005  Elliott et al.
(Continued)

OTHER PUBLICATIONS

PCT International Search Report and Written Opinion for PCT/US16/27155, Aug. 25, 2016, 23 Pages.

*Primary Examiner* — Duy M Dang
(74) *Attorney, Agent, or Firm* — Young Basile Hanlon & MacFarlane, P.C.

(57) ABSTRACT

A system identifies a scaling position in a captured image, and identifies red subpixels adjacent to the scaling position. The system computes a scaled red subpixel for the scaling position based on the identified red subpixels according to constraints. The system further computes a scaled blue subpixel based on identified adjacent blue subpixels, according to constraints, and computes a scaled green subpixel position based on Gr and Gb subpixels adjacent to the scaling position according to certain constraints. The system then generates a scaled image representative of the captured image, the scaled image including at least the scaled red subpixel value, the scaled blue subpixel value, and the scaled green subpixel value.

16 Claims, 15 Drawing Sheets

(51) Int. Cl.
*H04N 5/213* (2006.01)
*H04N 5/217* (2011.01)
*H04N 9/73* (2006.01)

(56) References Cited

U.S. PATENT DOCUMENTS

| | | |
|---|---|---|
| 2010/0309345 A1 | 12/2010 | Zimmer et al. |
| 2011/0019935 A1 | 1/2011 | Kelm et al. |
| 2011/0274349 A1 | 11/2011 | Kalevo |
| 2012/0026368 A1 | 2/2012 | Cote et al. |
| 2012/0188418 A1* | 7/2012 | Bosco .................... G06T 7/403 382/195 |
| 2014/0139642 A1* | 5/2014 | Ni ........................... H04N 9/09 382/162 |

\* cited by examiner

COLOR FILTER ARRAY SCALER

CROSS REFERENCE TO RELATED APPLICATION

This application claims the benefit of U.S. Provisional Application No. 62/174,786, filed Jun. 12, 2015 and U.S. Provisional Application No. 62/268,687, filed Dec. 17, 2015, the contents of each of which are incorporated by reference herein in their entirety.

BACKGROUND

2. Field of Art

The disclosure generally relates to the field of digital image and video processing, and more particularly to a color filter array scaler, temporal and spatial video noise reduction, the prevention of highlight clipping in video, and video global tone mapping.

3. Description of the Related Art

Cameras (and other imaging devices) capture images and videos using one or more lenses which gather light to be focused onto an image sensor. The image sensor is comprised of many individual subpixels. Each subpixel is comprised of a photosite and registers an intensity (luminance) value depending on how many photons are detected by the photosite. To produce a color image, the individual subpixels are designed to be sensitive to only certain wavelengths of the visible spectrum, for instance, to red, green, or blue portions of the visible spectrum. This selective sensitivity may be achieved by the use of a filter. Combinations of red, green, and blue subpixels are used to create a color pixel for a final image that is presented to the user. As the subpixels are arranged in a grid pattern on the image sensor, a typical arrangement for the subpixels is to have a repeating square of 2×2 subpixels, with each 2×2 square having one red, one blue, and two green subpixels. A Bayer color filter array includes color filters arranged in such a configuration, and is used widely in many cameras. Raw data captured using a Bayer color filter array includes individual red, blue, and green intensity values, and are processed to generate individual pixels that combine the red, blue, and green subpixel values together. These subpixel color values represent the intensity level of a respective color for that pixel. Each subpixel color value is encoded numerically, and has a range depending upon the bit depth of the image format. In some cases, the subpixel values of an image are adjusted to compensate for lightning irregularities.

As noted above, image sensors detect the intensity of light incident upon the image sensor, and converts these various light intensities to an analog signal (e.g., a voltage). This conversion process generates a certain amount of noise, and the amount of noise may change depending on the hardware configuration of the image sensor (e.g., larger photosites may generate lower noise). While the noise generated by the image sensor may be unavoidable, this noise may be reduced using various post-processing methods. The noise reduction improves the qualitative appearance of the image, though at the potential sacrifice of certain details in the image or the generation of various artifacts.

An image of a scene captured by a camera may be visually less appealing to a viewer than the original scene itself due to issues such as incorrect exposure values of the camera when capturing the scene, or the limited dynamic range of the camera. A photosite of an image sensor on a camera may become saturated at a particular exposure setting, and thus any areas of the scene with higher intensities than the saturation point are all shown as the maximum value. On the other hand, there may be a minimal number of photons being detected at the photosite, such that a low value is registered by the photosite that is at the minimum value of the range or below a noise floor. These limitations in the range of intensity values that the camera may capture can lead to images that are blown out, too dark, or a combination of these issues.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Example Camera Configuration

Figure 1:
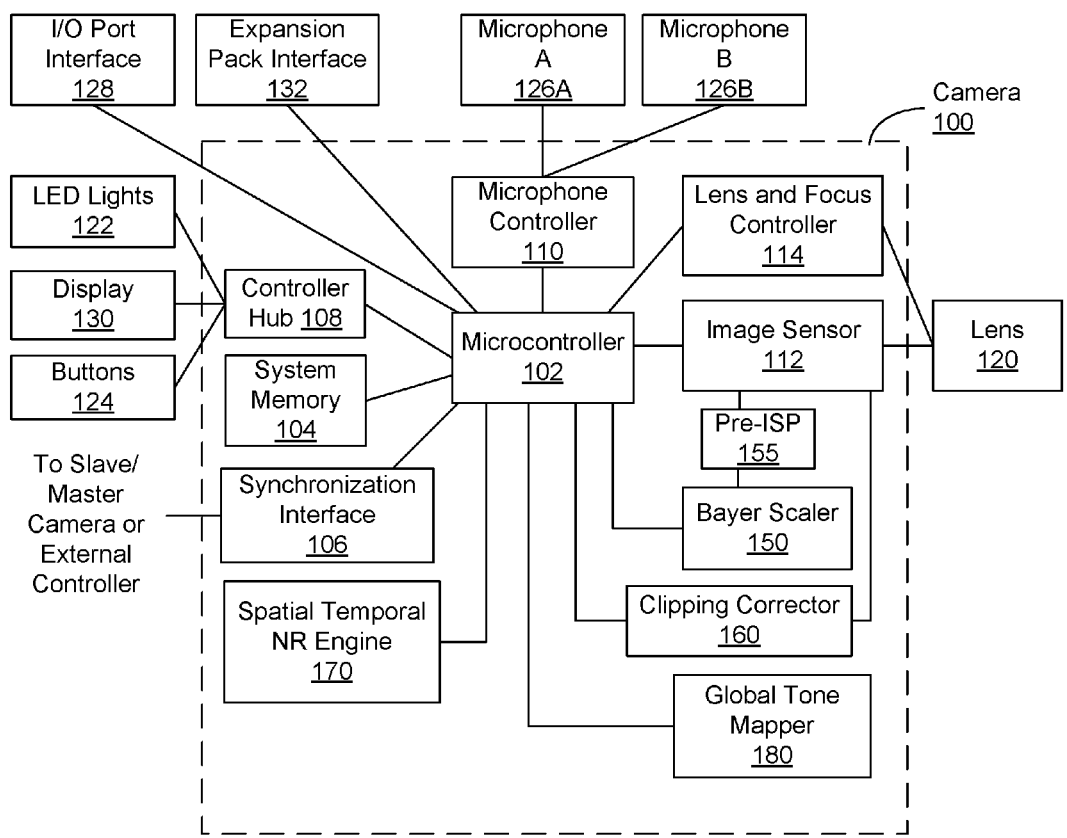
FIG. 1 illustrates an example high-level block diagram of a system for adjusting a color model of a digital image, according to one embodiment.

FIG. 1 is a block diagram illustrating electronic components of a camera 100, according to one embodiment. The camera 100 of the embodiment of FIG. 1 includes one or more microcontrollers 102, a system memory 104, a synchronization interface 106, a controller hub 108, one or more microphone controllers 110, an image sensor 112, a lens and focus controller 114, one or more lenses 120, one or more LED lights 122, one or more buttons 124, one or more microphones 126, an I/O port interface 128, a display 130, an expansion pack interface 132, a Bayer scaler 150, a clipping corrector 160, a spatial temporal noise reduction (NR) engine 170, and a global tone mapper 180.

The camera 100 includes one or more microcontrollers 102 (such as a processor) that control the operation and functionality of the camera 100. For instance, the microcontrollers 102 can execute computer instructions stored on the memory 104 to perform the functionality described herein. It should be noted that although LUT generation and color model conversion are described herein as performed by the camera 100, in practice, the camera 100 can capture image data, can provide the image data to an external system (such as a computer, a mobile phone, or another camera), and the external system can generate a LUT based on the captured image data.

A lens and focus controller 114 is configured to control the operation, configuration, and focus of the camera lens 120, for instance based on user input or based on analysis of captured image data. The image sensor 112 is a device capable of electronically capturing light incident on the image sensor 112 and converting the captured light to image data. The image sensor 112 can be a CMOS sensor, a CCD sensor, or any other suitable type of image sensor, and can include corresponding transistors, photodiodes, amplifiers, analog-to-digital converters, and power supplies. In one embodiment, the image sensor 112 includes a Bayer color filter array.

A system memory 104 is configured to store executable computer instructions that, when executed by the microcontroller 102, perform the camera functionalities described herein. The system memory 104 also stores images captured using the lens 120 and image sensor 112. The memory 104 can include volatile memory (e.g., random access memory (RAM)), non-volatile memory (e.g., a flash memory), or a combination thereof.

A synchronization interface 106 is configured to communicatively couple the camera 100 with external devices, such as a remote control, another camera (such as a slave camera or master camera), a computer, or a smartphone. The synchronization interface 106 may transfer information through a network, which allows coupled devices, including the camera 100, to exchange data other over local-area or wide-area networks. The network may contain a combination of wired or wireless technology and make use of various connection standards and protocols, such as Wi-Fi, IEEE 1394, Ethernet, 802.11, 4G, or Bluetooth.

A controller hub 108 transmits and receives information from user I/O components. In one embodiment, the controller hub 108 interfaces with the LED lights 122, the display 130, and the buttons 124. However, the controller hub 108 can interface with any conventional user I/O component or components. For example, the controller hub 108 may send information to other user I/O components, such as a speaker.

A microphone controller 110 receives and captures audio signals from one or more microphones, such as microphone 126A and microphone 126B. Although the embodiment of FIG. 1 illustrates two microphones, in practice, the camera can include any number of microphones. The microphone controller 110 is configured to control the operation of the microphones 126. In some embodiments, the microphone controller 110 selects which microphones from which audio data is captured. For instance, for a camera 100 with multiple microphone pairs, the microphone controller 110 selects one microphone of the pair to capture audio data.

In one embodiment, the camera 100 includes a Bayer scaler 150 to allow scaling of the mosaicked image at any continuous position coordinate of the image sensor, for instance prior to the image sensor data being received by the microcontroller 102. The Bayer scaler 150 is described below in greater detail.

In one embodiment, the camera 100 includes a clipping corrector 160 to correct for color irregularities arising due to saturation or desaturation of images. The clipping corrector 160 is described below in greater detail.

In one embodiment, the camera 100 includes a spatial temporal NR engine 170 that combines spatial and temporal noise reduction techniques for multiple image frames (e.g., in a video) while minimizing introduced artifacts (e.g., ghosting artifacts). The spatial temporal NR engine 170 is described below in greater detail.

In one embodiment, the camera 100 includes a global tone mapper 180 that takes an image with an initial histogram and converts it to a target image having a target histogram, for instance in order to create a more visually appealing image. The global tone mapper 180 is described below in greater detail.

Additional components connected to the microcontroller 102 include an I/O port interface 128 and an expansion pack interface 132. The I/O port interface 128 may facilitate the camera 100 in receiving or transmitting video or audio information through an I/O port. Examples of I/O ports or interfaces include USB ports, HDMI ports, Ethernet ports, audio ports, and the like. Furthermore, embodiments of the I/O port interface 128 may include wireless ports that can accommodate wireless connections. Examples of wireless ports include Bluetooth, Wireless USB, Near Field Communication (NFC), and the like. The expansion pack interface 132 is configured to interface with camera add-ons and removable expansion packs, such as an extra battery module, a wireless module, and the like.

Bayer Color Filter Array Scaler

Figure 2:
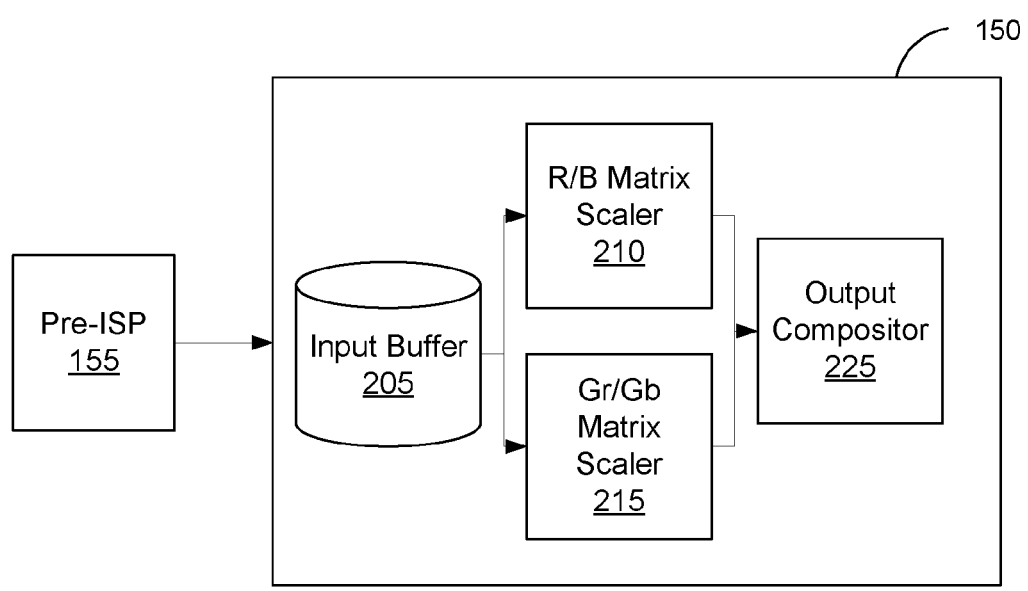
FIG. 2 illustrates an example high-level block diagram of the Bayer scaler, according to one embodiment.

FIG. 2 illustrates an example high-level block diagram of the Bayer scaler 150, according to one embodiment. In some embodiments, the Bayer scaler 150 is a hardware component that processes the data accessed from the image sensor 112 and sends this processed data to the microcontroller 102. The Bayer scaler 150 includes an input buffer 205, a red/blue (R/B) matrix scaler 210, a green-red/green-blue (Gr/Gb) matrix scaler 215, and an output compositor 225. The Bayer scaler 150 can include different and/or additional components than those illustrated in the embodiment of FIG. 2 to perform the functionalities described herein.

Figure 3:
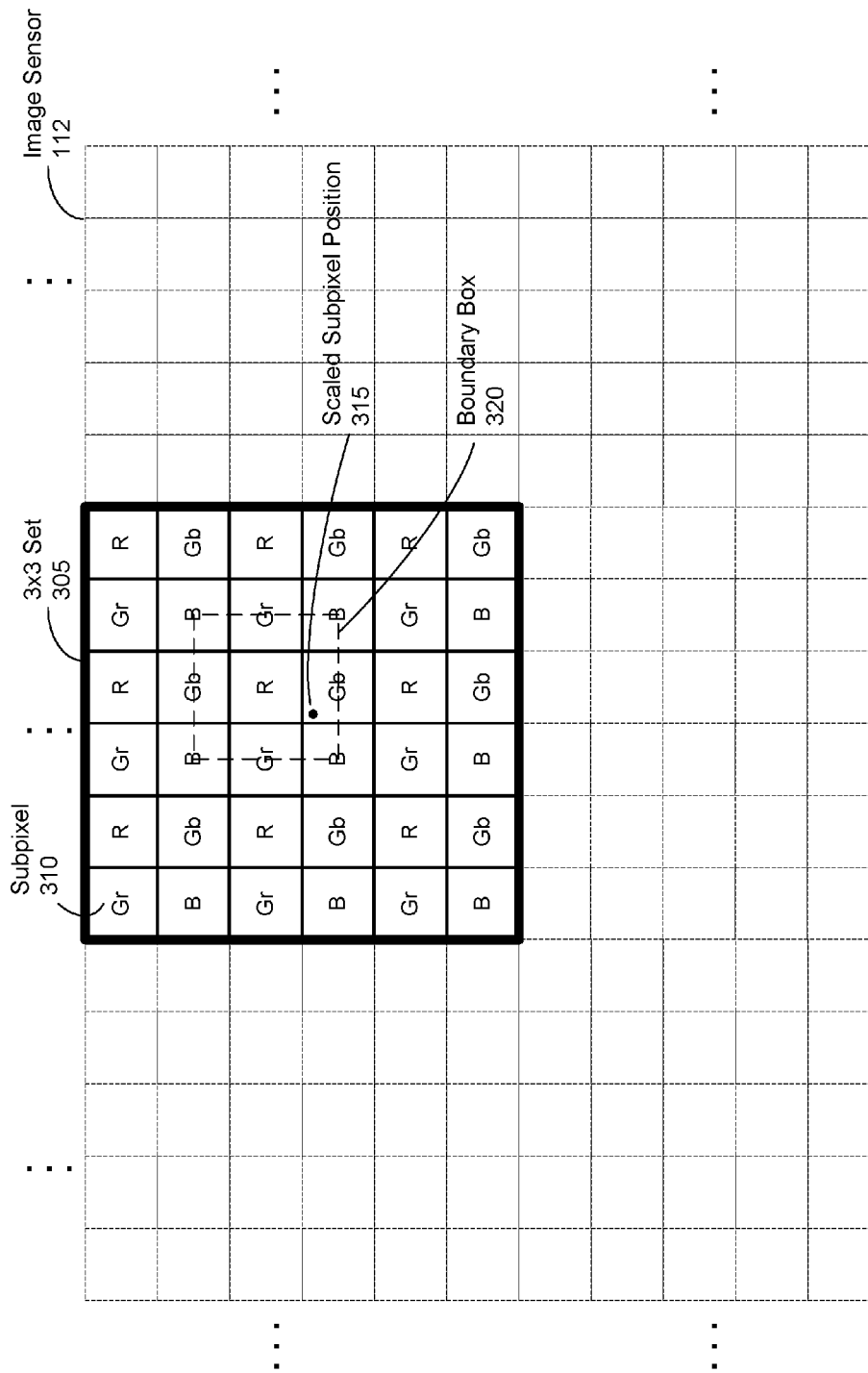
FIG. 3 illustrates an exemplary representation of the subpixels on the image sensor, according to an embodiment.

The input buffer 205 receives and/or accesses the image data from the image sensor 112. FIG. 3 illustrates an exemplary representation of the subpixels 310 on the image sensor 112, arranged via a Bayer filter array, according to an embodiment. Each subpixel 310 includes a photosite that determines the intensity of blue, red, or green wavelength light (i.e., photons) incident upon that photosite. The image sensor includes many subpixels 310, typically in the millions. For each red ("R") and each blue ("B") 310, there are two green subpixels 310 ("Gr" and "Gb"). These four subpixels, when combined, may represent a whole pixel and are typically combined in a demosaicing process implemented to determine a color intensity. Referring back to FIG. 2, the input buffer 205 receives all or a portion of the intensity values of these subpixels 310 from the image sensor 112.

In one embodiment, the input buffer 205 receives the image data from the pre-ISP 155. The pre-ISP 155 may perform minor processing on the image data before the input buffer 250 receives the image data. In one case, the pre-ISP 155 corrects the image data for dead pixels. The pre-ISP 155 determines whether any subpixels in the image data are dark (i.e., all black) or fully saturated and not similar to surrounding intensity values of surrounding subpixels (i.e., the dark or saturated subpixels are beyond a threshold range of the intensity values of surrounding subpixels). For these dead pixels, the pre-ISP 155 may replace their intensity values with a more reasonable value, such as an average of the intensity values of surrounding subpixels (of the same color).

The R/B matrix scaler 210 determines an intensity value of a scaled red or blue subpixel at a scaled subpixel position according to the values of surrounding red or blue subpixels and the position of the scaled subpixel location. Referring back to FIG. 3, a scaled subpixel position 315 is selected on the image sensor 112. Note that the selection of the scaled subpixel position 315 is not restricted to the position of any particular subpixel. Once the scaled subpixel position 315 is selected, the R/B matrix scaler 210 determines the red intensity value for that scaled subpixel position 315 based on the position of the scaled subpixel position 315 relative to the surrounding red subpixels and the value of the surrounding red subpixel values. In other words, the R/B matrix scaler 210 determines an intensity value for a subpixel at the scaled subpixel position 315, even though the scaled subpixel position 315 does not correspond exactly to the center position of any subpixel 310 on the image sensor 112. The R/B matrix scaler 210 determines the blue intensity value for that scaled subpixel position 315 in the same fashion, but considers the surrounding blue subpixels instead. Note that for the purposes of the following discussion, the discussion of red and blue subpixels may be interchangeable and when referring to red subpixels, the same description may be used for blue subpixels as well.

The surrounding subpixels that are considered are those subpixels that are adjacent to a virtual boundary box 320 containing the scaled subpixel position 315. The boundary box 320 is a square box intersecting the center of the subpixels of a three by three grid of subpixels surrounding the scaled subpixel position 315 as illustrated in FIG. 3. In some embodiments, the R/B matrix scaler 210 selects the boundary box 320 such that a red (or blue) subpixel is at the center of the boundary box 320, and such that the boundary box 320 surrounds the scaled subpixel position 315. In some embodiments, the R/B matrix scaler 210 also selects the boundary box 320 at a position such that the scaled subpixel position 315 is most centrally located within the boundary box 320. Once the R/B matrix scaler 210 selects the boundary box 320, the R/B matrix scaler 210 determines a 3×3 set 305 surrounding the boundary box 320. The 3×3 set 305 includes nine sets of pixels (with each pixel including an R, B, Gr, and Gb subpixel). As illustrated in FIG. 3, there are a total of nine red subpixels within the 3×3 set 305 for the boundary box 320. These include the eight red subpixels immediately adjacent to the boundary box, as well as the red subpixel located at the center of the boundary box 320.

After determining the nine red (or blue) subpixels for the scaled subpixel position 315, the R/B matrix scaler 210 determines the red (or blue) intensity value at the scaled subpixel position 315 based on the position of the scaled subpixel position 315 and the values of the surrounding nine subpixels.

Using such a scaler, the image data from the image sensor may be scaled before any other image processing is performed against the image data, reducing processing power used and/or required. Alternatives, such as binning received subpixels (e.g., each bin having 2×2 subpixels), generates poorer quality images. Using a Bayer color filter array scaler allows a camera system to fully exploit the pixel processing capability by scaling the maximum supported resolution before pixel processing and possibly scaling again to the desired resolution after pixel processing. This allows the camera to achieve the best possible image quality for a given pixel processing capability.

As a more concrete example of such the benefit, suppose a system is to be designed to process images from a 12 megapixel camera at 30 frames per second, with output images being 8 megapixels/second. Using the Bayer scaler, the 12 megapixel images may be downscaled to 8 megapixel images using a scale factor of 1.22. The 8 megapixel images are processed instead, reducing the pixel processing requirements from 360 megapixels/second to 240 megapixels/second.

Figure 4:
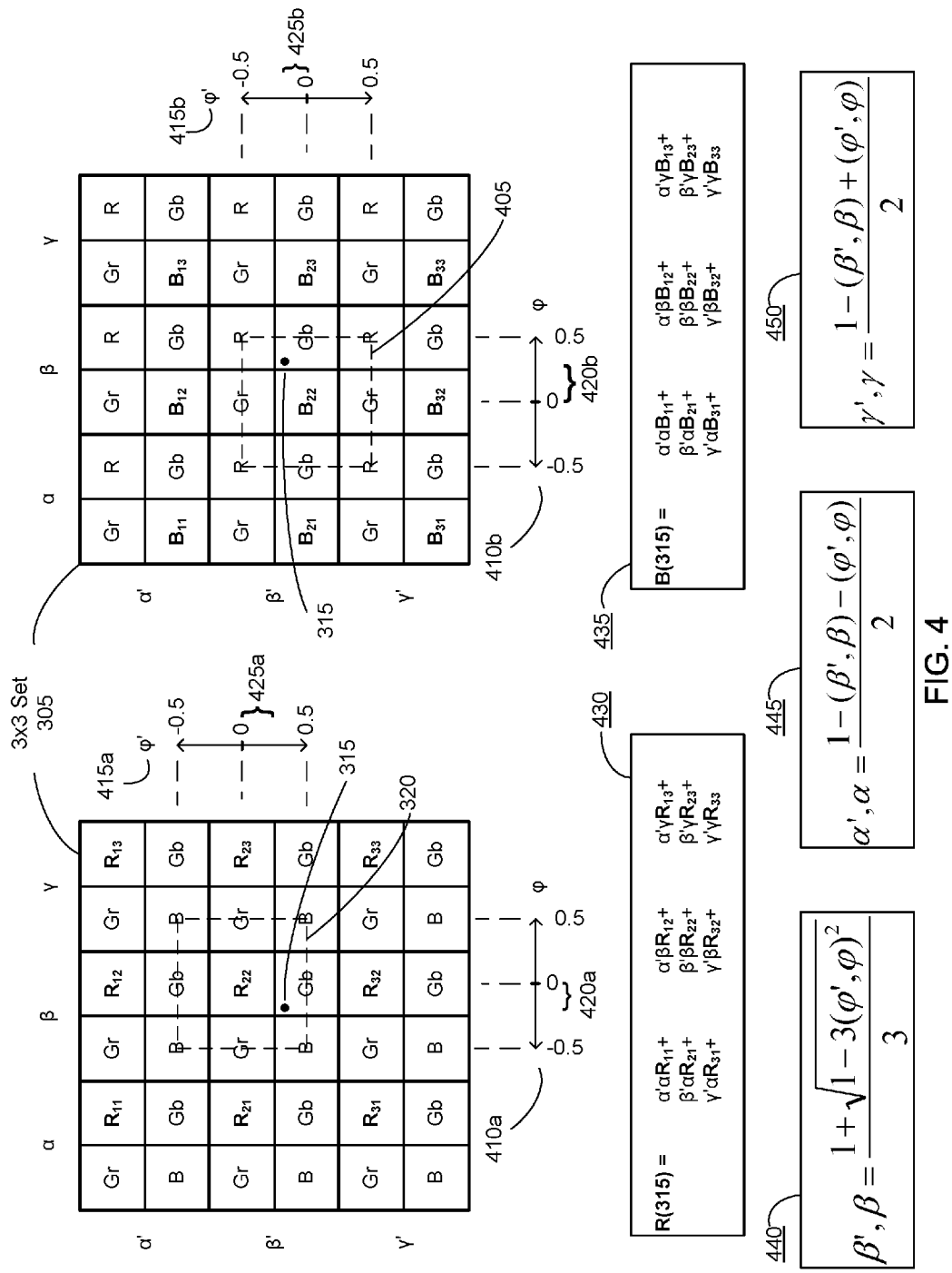
FIG. 4 illustrates an exemplary process for determining the intensity value of the scaled subpixel position for both red and blue subpixels.

FIG. 4 illustrates an exemplary process for determining the intensity value of the scaled subpixel position 315 for both red and blue subpixels, according to an embodiment. In one embodiment, to compute the intensity value at the scaled subpixel position 315, the R/B matrix scaler 210 modifies each of the nine red (or blue) subpixel values by computed coefficients and sums the result together. As shown in FIG. 4, the vertical axis of the 3×3 set 305 is labeled with $\alpha'$, $\beta'$, and $\gamma'$ (alpha prime, beta prime, and gamma prime, respectively), and the horizontal axis of the 3×3 set is labeled with $\alpha$, $\beta$, and $\gamma$ (alpha, beta, and gamma, respectively). These labels represent the coefficients by which the nine red or blue subpixel values, labeled as $R_{11}$ thru $R_{33}$ for red or $B_{11}$ thru $B_{33}$ for blue, are multiplied by in order to determine the intensity value at the scaled subpixel position 315. Block 430 illustrates the equation used by the R/B matrix scaler 210 to compute the red intensity value at the scaled subpixel position 315, and block 435 illustrates the equation used by the R/B matrix scaler 210 to compute the blue intensity value at the scaled subpixel position 315. Note that each of the nine red or blue subpixel values are multiplied by a prime and a non-prime coefficients according to that subpixel's position relative to the boundary box. For example, $R_{23}$ is multiplied by $\beta'$ as it is in the second row, and is also multiplied by $\gamma$, as it is in the third column.

In some embodiments, the R/B matrix scaler 210 computes the values of the coefficients ($\alpha$, $\beta$, $\gamma$, $\alpha'$, $\beta'$, and $\gamma'$) by adhering to certain constraints. The constraints are: 1) to preserve the overall color of the resulting image, 2) to ensure the accuracy of the computed intensity value at the scaled subpixel position relative to the neighboring subpixels of the image sensor, 3) to achieve a constant noise level (or a noise level within a threshold), and to 4) achieve a constant blur level (or a blur level within a threshold). One reason that a constant noise level is a constraint is that subsequent post-processing, such as denoising, is simplified if the noise level is consistent for each subpixel. One reason for a constant blur level is that the blur levels in the image that is ultimately produced are uniform throughout the image, allowing the image to retain an acceptable visual quality.

To achieve a preservation of the overall color of the image, the sum of the values of $\alpha'$, $\beta'$, and $\gamma'$ and the sum of the values of $\alpha$, $\beta$, and $\gamma$ should each equal 1. By implementing this constraint, the resulting intensity value at the scaled subpixel position 315 is not lightened or darkened relative to the original image as captured by the subpixels 310.

To achieve an accuracy of the intensity values in regards to the position of the scaled subpixel position 315, the difference between the values of $\alpha$ and $\gamma$ (or $\alpha'$ and $\gamma'$) should be equal to the distance of the scaled subpixel position from the center of the boundary box. For $\alpha$ and $\gamma$, this distance is indicated by $\phi$, and for $\alpha'$ and $\gamma'$ this distance is indicated by $\phi'$. In other words, the coefficients are to adhere to the constraint of $-\alpha+\gamma=\phi$ (and $-\alpha'+\gamma'=\phi'$). The distance of $\phi$ or $\phi'$ ranges from $-0.5$ to $0.5$ as indicated by 415 and 425 in FIG. 4. $\phi$ is $-0.5$ or $0.5$ when the scaled subpixel position 315 is at one of the borders of the boundary box 320, and $\phi$ is 0 when the scaled subpixel position 315 is at the center of the boundary box. Additionally, if $\phi=-\frac{1}{2}$, $\gamma$ should be zero, and if $\phi=\frac{1}{2}$, then $\alpha=0$ to ensure regularity when crossing the boundary of box 320.

To ensure a constant or near constant (e.g., within a threshold) noise level when determining the intensity value of the scaled subpixel position 315, the sum of the squares of each set of 3 coefficients should be equal or substantially equal (within a threshold) to a constant value n for all computations of the intensity value. In other words, $\alpha^2+\beta^2+\gamma^2=n$ and $\alpha'^2+\beta'^2+\gamma'^2=n$. In some embodiments, the value of the constant is 0.5. The reason for selecting 0.5 is that for a scaled subpixel position 315 at the boundary box 320, that position is shared between the current boundary box 320 as well as a neighboring boundary box, which implies that one of $\alpha$ and $\gamma$ must be null, which in turn implies that coefficients must be $\frac{1}{2}$, $\frac{1}{2}$, 0 for which n=$\frac{1}{2}$.

To ensure a constant or near constant (e.g., within a threshold) blur level when determining the intensity value of the scaled subpixel position 315, the sum of each coefficient multiplied by the square of the distance of each subpixel from the scaled subpixel position 315 (i.e., the "center of gravity") should be equal to (or near to) a constant value b. In other words, $\alpha(\phi+1)^2+\beta\phi^2+\gamma(\phi-1)^2=b$ and $\alpha'(\phi+1)^2+\beta'\phi^2+\gamma'(\phi-1)^2=b$. In one embodiment, the constant is $\frac{3}{8}$. This values $\frac{3}{8}$ is derived from the boundary condition with a similar reasoning as for the noise level.

The R/B matrix scaler 210 uses the above constraints to solve for the coefficients $\alpha$, $\beta$, and $\gamma$, and similarly for $\alpha'$, $\beta'$, and $\gamma'$. Since there are more constraints than there are coefficients, the solution may not be an exact match. Instead, in order to determine a solution, the R/B matrix scaler 210 selects the coefficients such that the computed values for the last two constraints are within a threshold value (e.g., 5% can be achieved) of the constants for noise and blur. For example, the coefficients are selected such that the sum of the squares of the coefficients produce a result that is within a threshold value of the noise constant value n, and the same is done for the blur constant value b.

The resulting solutions that the R/B matrix scaler 210 uses to compute the coefficients are illustrated in block 440 for $\beta$ and $\beta'$, block 445 for $\alpha$ and $\alpha'$, and block 450 for $\gamma$ and $\gamma'$. By solving for the coefficients according to the constraints indicated above, the R/B matrix scaler 210 may use the solutions indicated in these blocks to determine the coefficients. Note that the solutions for $\alpha$ and $\gamma$ depend on the value of $\beta$. Furthermore, as noted above, as more than three constraints are indicated for solving three coefficients, multiple solutions may exist that may approximate the noise and blur constants, and thus $\beta$ may alternatively be solved by the solutions:

$$\overline{\beta}, \overline{\beta}' = \frac{3}{4} - (\varphi, \varphi')^2, \qquad (1)$$

and $$\beta, \beta' = \frac{-1 + \sqrt{10 - 15(\varphi, \varphi')^2}}{3} \qquad (2)$$

Note that equation (1) is based on the Bezier interpolation of three subpixels, and although it may yield good noise levels, it yields poor blur levels of +/−10% which may not result in visually acceptable images.

Upon solving for these coefficients, the coefficients may then be used to solve for the intensity value of the red or blue intensity value at the scaled subpixel position 315 according to the solutions at block 430 and block 435. Note again that although the description above may have been made with regards to red, the same process applies to computing the blue intensity value for the scaled subpixel position 315. The primary difference is that the boundary box 405 for the blue intensity value is centered on a blue subpixel, such as "$B_{22}$" as illustrated in FIG. 4, and the distances of $\phi$ (e.g., 420b and 425b) for the scaled subpixel position 315 are determined relative to this new boundary box 315.

Referring back to FIG. 3, the Gr/Gb matrix scaler 215 determines a green intensity value at a scaled subpixel position 315 based on surrounding green subpixel values. As in the case of the red and blue intensity values, the Gr/Gb matrix scaler 215 also computes the green intensity at the scaled subpixel position 315 based on the distance of the scaled subpixel position 315. However, as the image sensor includes two green subpixels for each blue and red subpixel, the determination of the green intensity value at the scaled subpixel position 315 may be made with greater accuracy while having less noise and blurring.

Figure 5:
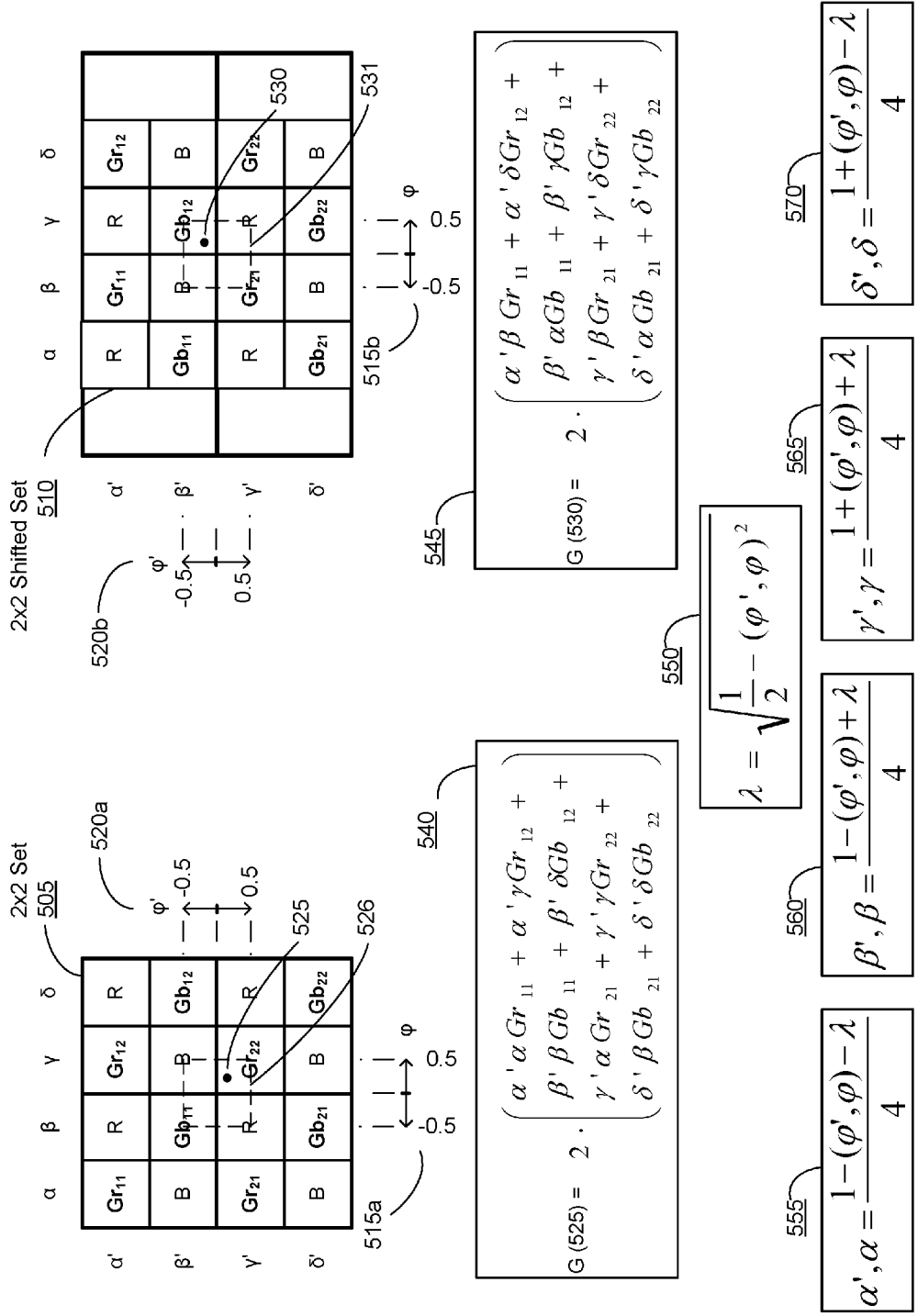
FIG. 5 illustrates an exemplary process for determining the intensity value of a scaled subpixel position for green subpixels, according to an embodiment.

FIG. 5 illustrates an exemplary process for determining the intensity value of a scaled subpixel position for green subpixels, according to an embodiment. Compared to the process described above for the blue or red subpixels, since the image sensor 112 has double the number of green subpixels 310 compared to blue or red subpixels, the Gr/Gb matrix scaler 215 can use a smaller boundary box 526 that intersects the center of four subpixels instead of the eight subpixels in the blue or red subpixel case as described above. The boundary box 526 encloses the scaled subpixel position 525, and has at two of its corners a green subpixel. The Gr/Gb matrix scaler 215 uses eight green subpixels of a surrounding 2×2 set 505 of pixels to determine the intensity of the scaled subpixel position 525 within the boundary box 526. As shown, while previously a 3×3 set 305 was needed and included a total of nine red or blue subpixels, with the green subpixels only a 2×2 set 505 is needed to yield eight subpixels. Since the Gr/Gb matrix scaler 215 determines the resulting intensity value using a smaller set, the resulting intensity value more accurately represents the color at the particular scaled subpixel position 525.

To determine the boundary box 526, the Gr/Gb matrix scaler 215 determines a square boundary box surrounding the scaled subpixel position 525 that also has at two of the corners of the square a green subpixel. While in the 2×2 set 505 the top left subpixel is a green subpixel, in other cases the scaled subpixel position is selected such that the boundary box is formed so that the top left corner of the 2×2 set is not a green subpixel. In this case, the subpixels are "shifted" like in the 2×2 shifted set 510 with the boundary box 531 (with the scaled subpixel position 530). The remaining discussion will be made primarily with reference to the non-shifted case, however the shifted case is processed in a similar fashion, with the coefficients modified due to the shifted position of the green subpixels.

As with the R/B matrix scaler 210, the Gr/Gb matrix scaler 215 determines the green intensity value of the scaled subpixel position 525 based on the positions of the surrounding green subpixels in the 2×2 set and based on certain constraints. Note that although the Gr and Gb green subpixels are labeled separately in FIG. 5 to accurately portray the image sensor 112, when determining the green intensity value, these two green subpixels are treated the same. For example, although the top left corner of the 2×2 set 505 has a Gr subpixel, the coefficients described below are computed the same as if the top left corner included a Gb subpixel.

As with the R/B matrix scaler 210, the Gr/Gb matrix scaler 215 determines a distance $\phi$ of the scaled subpixel position 525 from the center of the boundary box 526. In the case of the green subpixels, the distance measured is smaller than when determining the blue or red intensity values. However, the $\phi$ value of the scaled subpixel position 525 is also set to 0.5 when the scaled subpixel position 525 is at the border of the boundary box 526. This is because at the boundary point, the scaled subpixel position 525 is halfway between two green subpixels.

The Gr/Gb matrix scaler 215 computes the green intensity value based on the solution indicated at block 540 (and block 545 for the shifted set). Note that similar to the solution for the blue and red intensity values as described above, the solution for the green intensity value sums the eight green subpixels of the 2×2 set 505 as modified by coefficients, with the coefficients set based on the coordinates of each subpixel in the 2×2 set 505. Since each green subpixel is within one of four rows and four columns, four coefficients are needed instead of three as in the blue/red case. These four coefficients are $\alpha$, $\beta$, $\gamma$, and $\delta$ (alpha, beta, gamma, and delta).

The constraints for determining the green intensity value can be similar to the constraints for determining the blue/red intensity values, but can additionally consider the differences between the sensitivities of Gr and Gb green subpixels. Typically, in a Bayer color filter array, the Gr green subpixel has a photosite that is more sensitive than that of the Gb green subpixel. The Gr/Gb matrix scaler 215 additionally compensates for this difference in sensitivity based on an added constraint.

As in the previous case, the first constraint ensures that color values are consistent with the original image, and takes the form: $\alpha+\beta+\gamma+\delta=1$. The second constraint takes into account the positions of the surrounding subpixels with reference to the scaled subpixel position 525, and thus takes the form: $-1.5\alpha-0.5\beta+0.5\gamma+1.5\delta=\phi$. Note that compared to the blue/red case, the center of the furthest green subpixel from the boundary box is 1.5 units away (where the scale of $\phi$ is 1 unit per subpixel). The third constraint constrains the solution to a constant noise and blur level, thus similar to the blue/red case: $\alpha^2\alpha'^2+\alpha^2\gamma'^2+\beta^2\beta'^2+\beta^2\delta'^2+\gamma^2\alpha'^2+\gamma^2\gamma'^2+\delta^2\beta'^2+\delta^2\delta'^2=n^2$ (note that this equation is $\alpha^2\beta'^2+\alpha^2\delta'^2+\beta^2\alpha'^2+\beta^2\gamma'^2+\gamma^2\beta'^2+\gamma^2\delta'^2+\delta^2\alpha'^2+\delta^2\gamma'^2=n^2$ when the scaled subpixel position is "shifted" as noted above). The fourth constraint constrains the range of the coefficients based on position: $\delta=0$ if $\phi=-0.5$ and $\alpha=0$ if $\phi=0.5$. The last constraint adjusts for any imbalance in the Gr and Gb subpixels, so that the constraint takes the form: $\alpha+\beta=\gamma+\delta$. This ensures that differences of the Gr and Gb subpixels are equalized. Note that the same constraints are used for the prime coefficient values by substituting each coefficient for its prime coefficient (i.e., $\alpha'$, $\beta'$, $\gamma'$, $\delta'$, and $\phi'$), although for the noise/blur constraint equation as shown above, no prime coefficients may be substituted as it is has a combination of the horizontal and vertical components. As in the blue/red case, the solution to the coefficients using these constraints may be approximated if the constraints do not yield a single solution.

The solution to the coefficients given the constraints are shown in blocks 550-570 in FIG. 5. The solutions for $\alpha$, $\beta$, $\gamma$, and $\delta$ (and their prime values) are parameterized based on a $\lambda$ value and the $\phi$ value (the $\phi$ value being the distance from the center of the boundary box to the scaled subpixel position). After determining the coefficients, the Gr/Gb matrix scaler 215 determines the green intensity value at the scaled subpixel position 525. The Gr/Gb matrix scaler 215 performs similar operations to determine the green intensity value for the 2×2 shifted set 510 for the scaled subpixel position 531.

Referring back to FIG. 2, the Gr/Gb matrix scaler 215 and the R/B matrix scaler 210 may determine green and red and blue intensity values for multiple scaled subpixel positions. For instance, for a 3:2 scaled image, a scaled subpixel is computed for every 1.5 pixels in each image dimension. Subsequently, the output compositor 225 composes these computed scaled subpixel values into a new image, which is sent to the microcontroller 102 for further processing.

Ultimately, by performing a scaling process using the above disclosed Bayer scaler on the image prior to any further processing and at the color filter array level, significant performance advantages are achieved, and the hardware components required to implement this scaling are reduced, as additional memory and processing blocks do not need to be implemented in the system to process additional subpixel data. This may result in lowered overall hardware costs as well as increased battery life.

Furthermore, the scaled subpixel position that is selected may be arbitrary, and may be selected without restriction. In other words, the selection of scaled subpixel positions is not limited by a fixed grid of positions. For example, if the Bayer scaler 150 scales an image, the scale does not have to be a multiple of the number of subpixels in the image sensor 112 (e.g., 2×, etc.), as any scaled subpixel positions may be selected (e.g., 1.1×, 1.2×, etc.).

The Bayer scaler 150 may receive an arbitrary number of subpixels per clock cycle (e.g., 2 or 4 subpixels per clock cycle). In every case, the Bayer scaler 150 may be configured (e.g., via parallel circuitry) to output subpixel values at an output rate that is within a threshold range of the input rate.

In one embodiment, the Bayer scaler 150 performs a linear zoom operation on the captured image from the image sensor 112. In such a case, the solution for two subpixels A and B with a scaled subpixel position f is $\alpha A+\beta B$, with the solution to the coefficients as follows, which allows a 5% stability on both noise and blur to be achieved.

$$\lambda = \sqrt{\frac{1}{2} - \varphi^2} \quad (3)$$

$$\alpha = \frac{1 - \varphi - \lambda}{4} \quad (4)$$

$$\beta = \frac{1 - \varphi + \lambda}{4} \quad (5)$$

$$\gamma = \frac{1 + \varphi + \lambda}{4} \quad (6)$$

$$\delta = \frac{1 + \varphi - 4}{4} \quad (7)$$

Exemplary Process for Bayer Scaling

Figure 6:
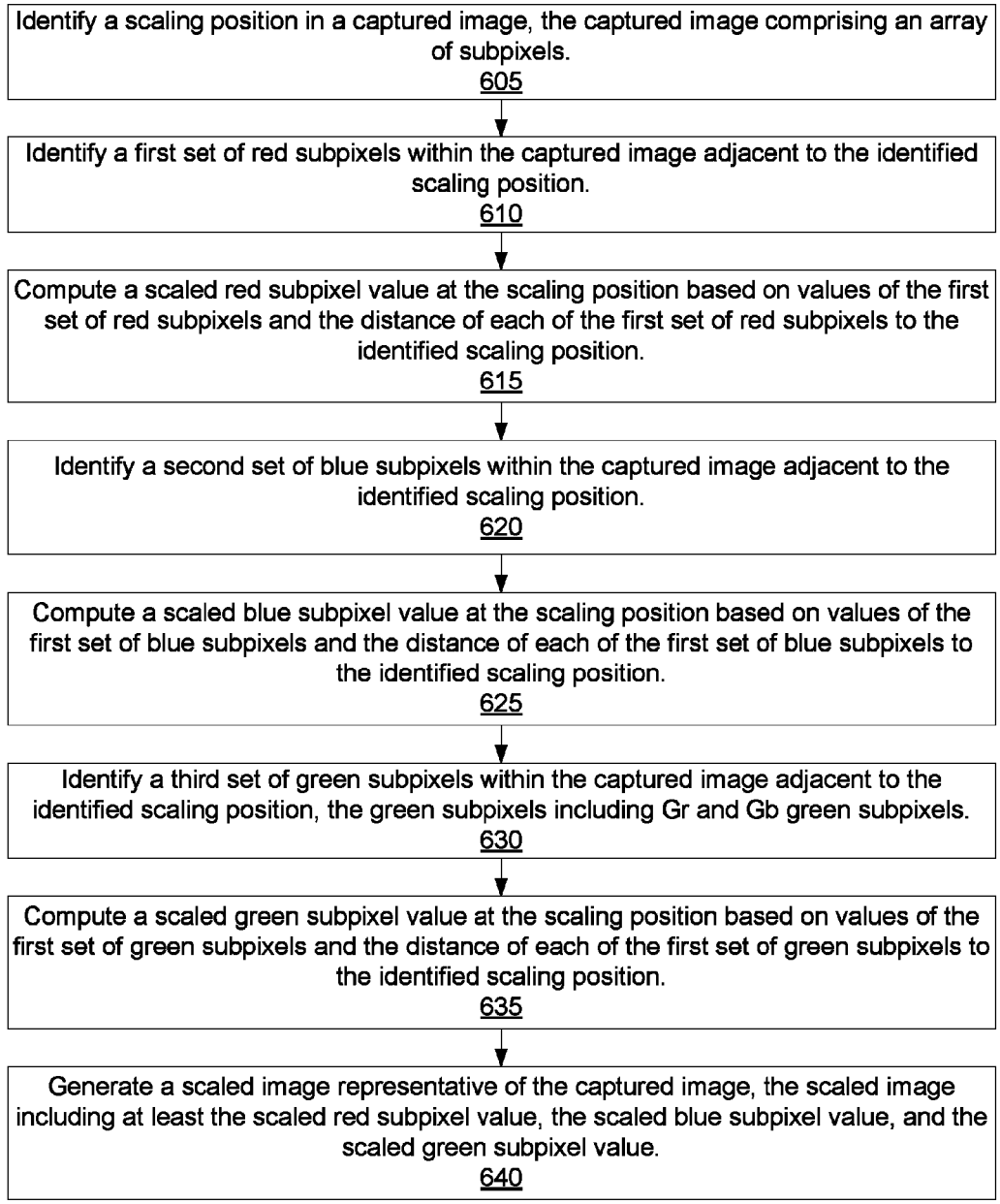
FIG. 6 illustrates a method for Bayer scaling at a continuous scaled subpixel position, according to one embodiment.

FIG. 6 illustrates a method for Bayer scaling at a continuous scaled subpixel position, according to one embodiment. In other embodiments, the method includes different, additional, or fewer steps than those depicted by FIG. 6. Additionally, in some embodiments, the steps described in conjunction with FIG. 6 may be performed in different orders.

Initially, the Bayer scaler 150 identifies 605 a scaling position in a captured image, the captured image comprising an array of subpixels. This scaling position may be provided externally, or determined algorithmically. For example, the Bayer scaler 150 may determine the scaling position based on a regular offset distance.

The Bayer scaler 150 identifies 610 a first set of red subpixels within the captured image adjacent to the identified scaling position. These red subpixels are those in a 3×3 set which surrounds a boundary box that includes the scaled position. The center of the boundary box includes a red subpixel.

The Bayer scaler 150 computes 615 a scaled red subpixel value at the scaling position based on values of the first set of red subpixels and the distance of each of the first set of red subpixels to the identified scaling position. In one embodiment, the Bayer scaler 150 computes the scaled red subpixel value based on the solution described above.

The Bayer scaler 150 identifies 620 a second set of blue subpixels within the captured image adjacent to the identified scaling position. These second set of blue subpixels are also part of 3×3 set surrounding a boundary box that includes the scaled position. The center of this boundary box includes a blue subpixel.

The Bayer scaler 150 computes 625 a scaled blue subpixel value at the scaling position based on values of the first set of blue subpixels and the distance of each of the first set of blue subpixels to the identified scaling position. In one embodiment, the Bayer scaler 150 computes the scaled blue subpixel value based on the solution described above.

The Bayer scaler 150 identifies 630 a third set of green subpixels within the captured image adjacent to the identified scaling position, the green subpixels including Gr and Gb green subpixels. These Gr and Gb subpixels are those of a 2×2 pixel set surrounding a boundary box with a green subpixel at two opposite corners of the boundary box, and with the boundary box surrounding the scaled position.

The Bayer scaler 150 computes 635 a scaled green subpixel value at the scaling position based on values of the first set of green subpixels and the distance of each of the first set of green subpixels to the identified scaling position.

In one embodiment, the Bayer scaler 150 computes the scaled green subpixel value based on the solution described above.

The Bayer scaler 150 generates a scaled image representative of the captured image, the scaled image including at least the scaled red subpixel value, the scaled blue subpixel value, and the scaled green subpixel value. As described above, in some embodiments, the scaled image includes a set of scaled red subpixel values including the computed scaled red subpixel value, a set of scaled blue subpixel values including the computed scaled blue subpixel value, and a set of scaled green subpixel values including the computed scaled green subpixel value. In these embodiments, the set of scaled red subpixel values, the set of blue subpixel values, and the set of green subpixel values are combined to form the scaled image. The Bayer scaler 150 may output the scaled image in a format similar to the format in which the Bayer scaler 150 received the original image data. For example, if the image data was received by the Bayer scaler 150 as a set of subpixels, the Bayer scaler 150 may also output the data as a set of subpixels.

Highlight Clipping

Figure 7:
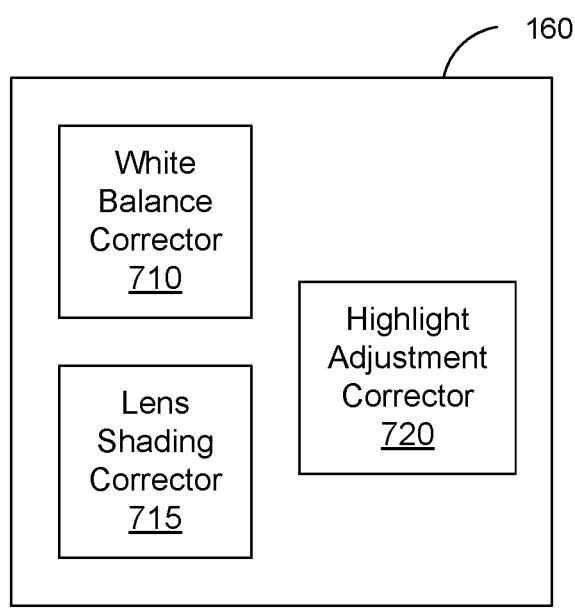
FIG. 7 illustrates an example high-level block diagram of a clipping corrector, according to one embodiment.

FIG. 7 illustrates an example high-level block diagram of the clipping corrector 160, according to one embodiment. In some embodiments, the clipping corrector 160 is a hardware component that processes the image data accessed from the image sensor 112. The clipping corrector 160 includes a white balance corrector 710, a lens shading corrector 715, and a highlight adjustment corrector 720. The clipping corrector 160 can include different and/or additional components than those illustrated in the embodiment of FIG. 7 to perform the functionalities described herein.

The white balance corrector 710 determines whether an adjustment should be applied to a captured image from the image sensor 112 to correct for white balance errors. Errors in white balance may occur in instances where the colors captured by the image sensor 112 are not accurate relative to the color in the scene when viewed by the eye (potentially due to the varying spectral response of the image sensor). When correcting for white balance, the white balance corrector 710 may apply various algorithms, such as the grey world algorithm, a white point algorithm, a color by correlation algorithm, and so on, in order to determine the color temperature of the illuminant of the scene, and then correct the measured intensity values from the image sensor 112 such that white objects in the scene look white and such that the image appears the same as if viewed by a human. Based on the algorithm the white balance corrector 710 determines an adjustment value to be applied globally to one or more of the color channels (i.e., red, green, or blue) in order to compensate for the color temperature of the scene.

The lens shading corrector 715 determines whether an adjustment needs to be applied to a captured image to correct for lens shading. Lens shading occurs due to various factors, such as variations in the optical path of light through the lens assembly of a camera, the physical blockage of light by the lens barrel, the incident angle of the light ray on the image sensor, and so on. The effect on the captured image is that parts of the image, in particular the periphery, are darker than other parts of the image, such as the center. This artificial shading of portions of the image may be undesirable to a human viewer. To correct for this lens shading, the lens shading corrector 715 may apply various algorithms, such as by applying (on the fly) a calibrated shading compensation map to the captured image, by comparing the captured image with information regarding a reference image stored in a lookup table, or using a parametric correction function, and so on. These functions provide an adjustment value to apply to the color channels at portions of the image that are affected by shading.

In some embodiments, lens shading may also occur due to the response characteristics of an IR filter placed in front of the image sensor 112. Typically, an image sensor 112 will detect photons in the near-infrared wavelength range. Thus, without filtering IR wavelengths, the image sensor 112 will capture the intensity of IR wavelengths as well of light within the visible spectrum, producing image artifacts unrepresentative of the scene as viewed by a human. Instead, an IR filter is placed in front of the image sensor 112 to filter out any IR wavelengths. However, this IR filter may filter out light unevenly depending upon the incident angle of photons striking the filter. An example of an error occurring due to the IR filter is a pink/green halo appearing in an image of a uniform white area (e.g., a white wall). The lens shading corrector 715 may also apply an adjustment to different portions and color channels of the captured image to correct for the variations due to the IR filter.

The highlight adjustment corrector 720 applies an adjustment to pixels of an image while preventing the unnatural desaturation of highlight regions. The highlight adjustment corrector 720 receives an adjustment value to apply to one or more color channels within a portion of the image. For example, the lens shading corrector 715 may indicate a gain curve to apply to the three color channels across the image to correct for vignetting. The gain curve may indicate an adjustment value that is a multiplicative factor to be applied to each color value at each pixel in the image. This multiplicative factor may be greater or less than one.

The color intensity values of some pixels of the image may already be at the maximum saturation value. Each image has a limited dynamic range, and the maximum saturation value is the maximum value in the dynamic range of an image. For example, if each color channel of an image is 8-bits, the maximum saturation value is 255. When an image is captured (or previously adjusted), some color values at some portions of the image may exceed the maximum saturation value. In this case, these (highlight) portions of the image are displayed as white in color. However, the actual color of the scene captured by the image at that portion of the image may not have been white, but some other color, such as a light blue. The change in color in the captured image is due to the loss of information due to the limitations of the dynamic range changing the ratio of the color intensities at that pixel. While the color values are at a high intensity, this error may be less noticeable since the pixel appears to be near-white. However, if that portion of the image is adjusted with an adjustment value having a multiplicative factor less than one, the color values are decreased, and the incorrect ratio between the red, green, and blue colors is more noticeable, as the resulting pixel is no longer white and may have an unusual or unnatural color unrepresentative of the original color (e.g., light blue or grey if all channels are desaturated identically).

To adjust for this issue, the highlight adjustment corrector 720 performs the desaturation operation by determining whether the adjustment value made to a color intensity value of a pixel, or to all three color intensity values of the pixel, is greater than a corrected adjustment value equal to two times the input color value subtracted by the maximum saturation value. In other words, the highlight adjustment corrector 720 determines:

$$\text{out} = \max(\text{adjust} * \text{in}, 2(\text{in}) - \text{max\_saturation}) \quad (8)$$

For example, if the red color intensity of a pixel is at the maximum saturation value of 255, and the adjustment value is 0.7, then the highlight adjustment corrector 720 determines the larger of (0.7)*255 or 2*(255)−255. Here, the larger value is the latter, and so the red color intensity remains 255, and thus what is saturated in the image remains saturated. As another example, if the red color intensity is 100, with an adjustment factor of 0.7, the highlight adjustment corrector 720 determines the larger of 0.7*100 or 2(100)−255, which is 0.7*100=100. Note that as the adjustment value may be derived from a gain curve, it may be different for different for different color intensity levels.

Conversely, some color intensity values of some pixels of the image may not yet be at a maximum saturation value, but will be after application of the adjustment value. In such a case, the highlight adjustment corrector 720 adapts the adjustment value for those color intensity values that would reach a maximum saturation value such that the adjusted color value may not reach the maximum but is instead scaled based on the value of the adjustment factor. In other words, while the adjusted values will approach the maximum value, only the intensity values with the highest original values may reach the maximum value. The other intensity values may be set to be lower than the maximum saturation value, even though they would have exceeded the maximum saturation value had a simple scaling by the adjustment value been made.

Figure 8:
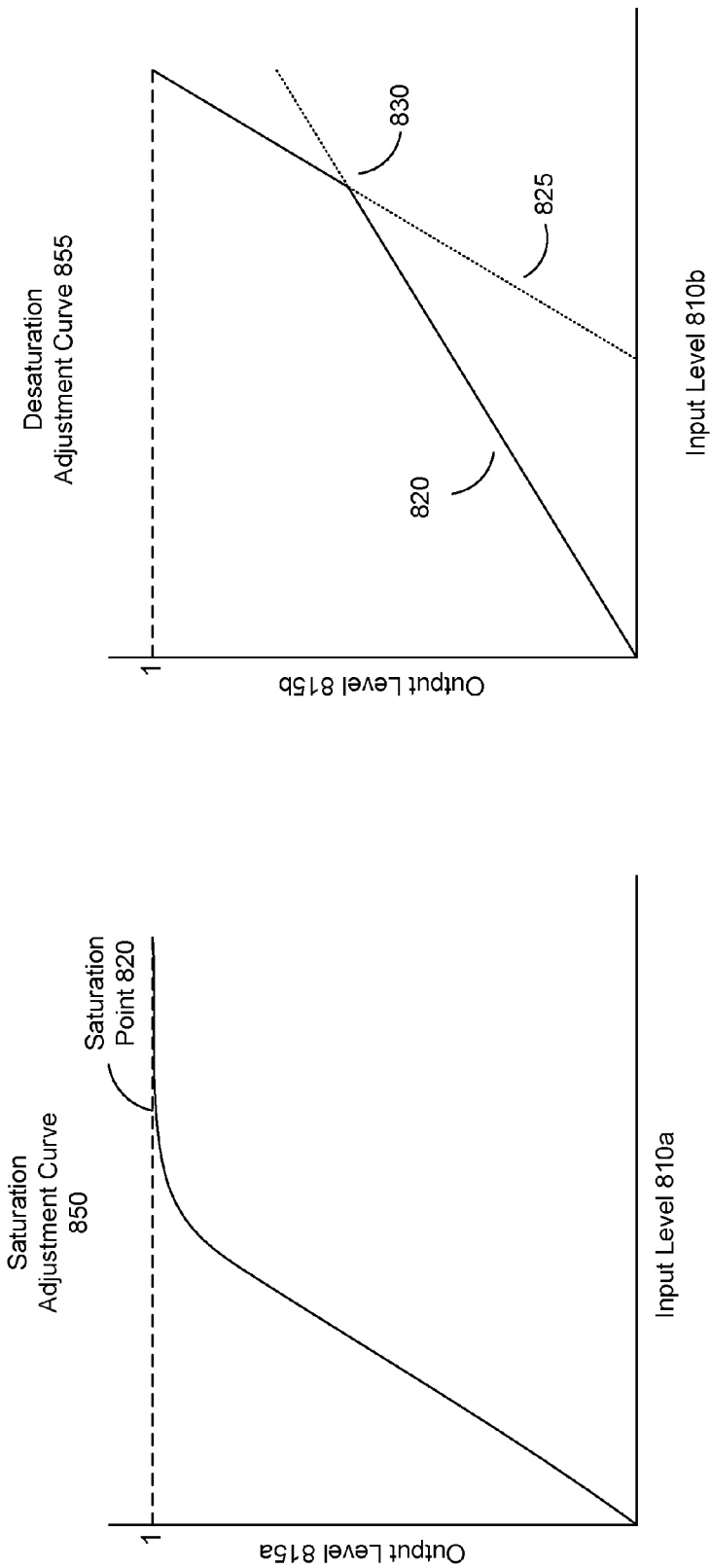
FIG. 8 illustrates exemplary color curves applied to an image, according to an embodiment.

FIG. 8 illustrates exemplary color curves applied to an image, according to an embodiment. The saturation adjustment curve 850 illustrates the result of adjusting the color levels of an image to be larger. Some values will reach a saturation point 820, and thus be limited by the maximum dynamic range of the image. However, other values are instead set to a value that is lower than the maximum saturation value. In the illustrated exemplary color curve 850, the highlight adjustment corrector 720 generates a curve that tapers off exponentially such that although high intensity values are near the saturation point, the high intensity values gradually reach the maximum saturation point.

Conversely, in the desaturation adjustment curve 855, instead of a simple scaling down of the color intensity values, the highlight adjustment corrector 720 performs the operation described above, where the maximum between the simple scaling value and the difference between double the input intensity value and the maximum saturation value are selected. The curve 825 represents the latter value, and the curve 820 represents the former value (i.e., simple scaling). The point 830 indicates where the two curves intersect, and the solid line indicates the resulting curve that is applied according to the function described above. Note that higher intensity values are not decreased significantly but remain high due to this curve, leaving the resulting color near-white and preventing unnatural colors from appearing due to desaturation.

Exemplary Process for Desaturation Protection

Figure 9:
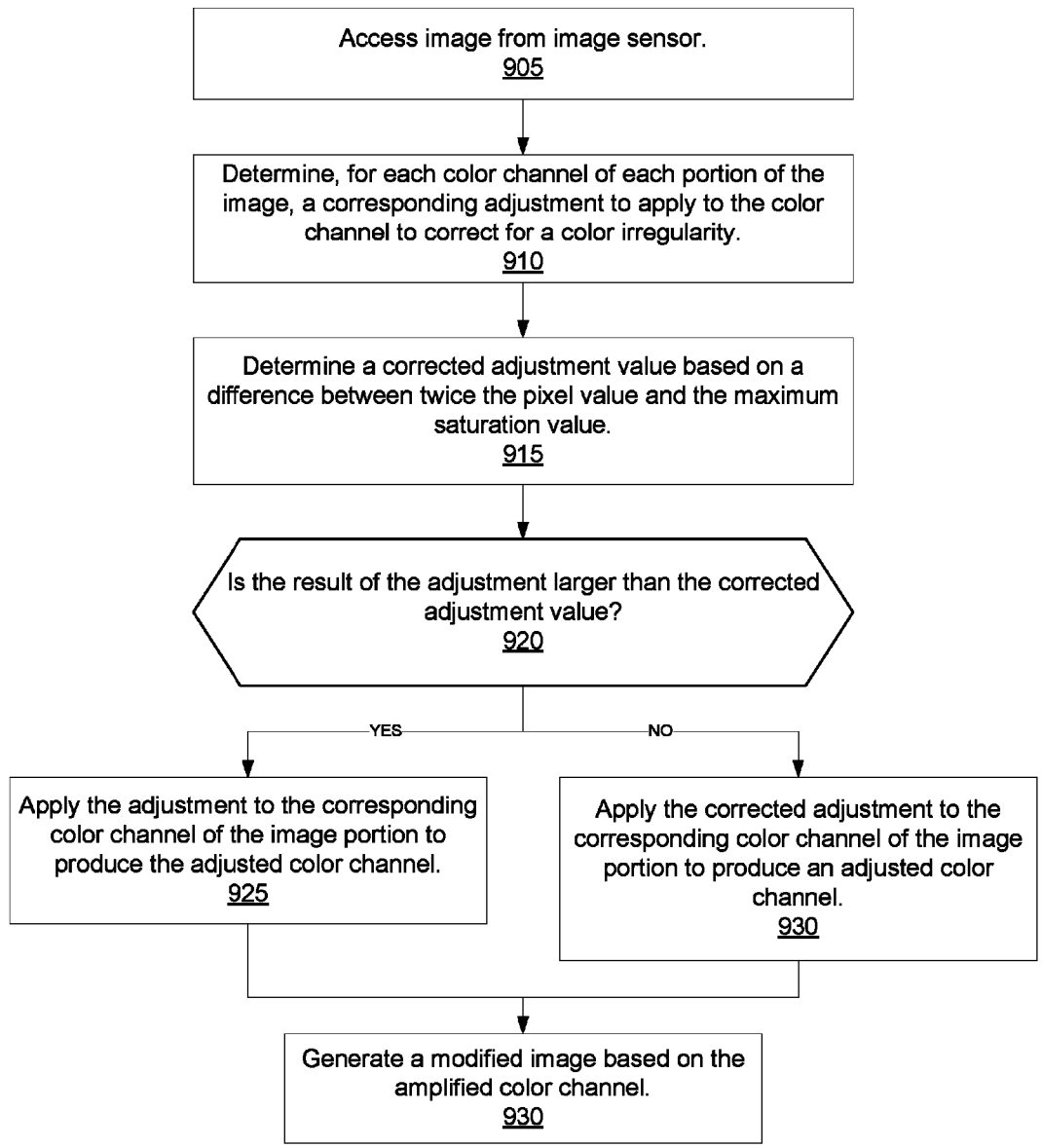
FIG. 9 illustrates a method for implementing desaturation protection, according to one embodiment.

FIG. 9 illustrates a method for desaturation protection, according to one embodiment. In other embodiments, the method includes different, additional, or fewer steps than those depicted by FIG. 9. Additionally, in some embodiments, the steps described in conjunction with FIG. 9 may be performed in different orders.

Initially, the clipping corrector 160 accesses 905 the image from image sensor. The clipping corrector 160 determines 901, for each color channel of each portion of the image, a corresponding adjustment to apply to the color channel to correct for a color irregularity. These may be color irregularities such as white balance issues and lens shading irregularities as described above.

The clipping corrector 160 determines 915 a corrected adjustment value based on a difference between twice the pixel value and the maximum saturation value. The maximum saturation value is the maximum value of the dynamic range supported by an image. For an image with an 8-bit color channel, this is 256 bits for each color.

The clipping corrector 160 determines 920 whether the result of the adjustment is larger than the corrected adjustment value. If so, the clipping corrector 160 applies 925 the adjustment to the corresponding color channel of the image portion to produce the adjusted color channel. In other words, the adjustment is applied to the intensity value of the pixel directly.

Otherwise, the clipping corrector 160 applies 930 the corrected adjustment to the corresponding color channel of the image portion to produce an adjusted color channel.

Spatial Temporal Noise Reduction

Figure 10:
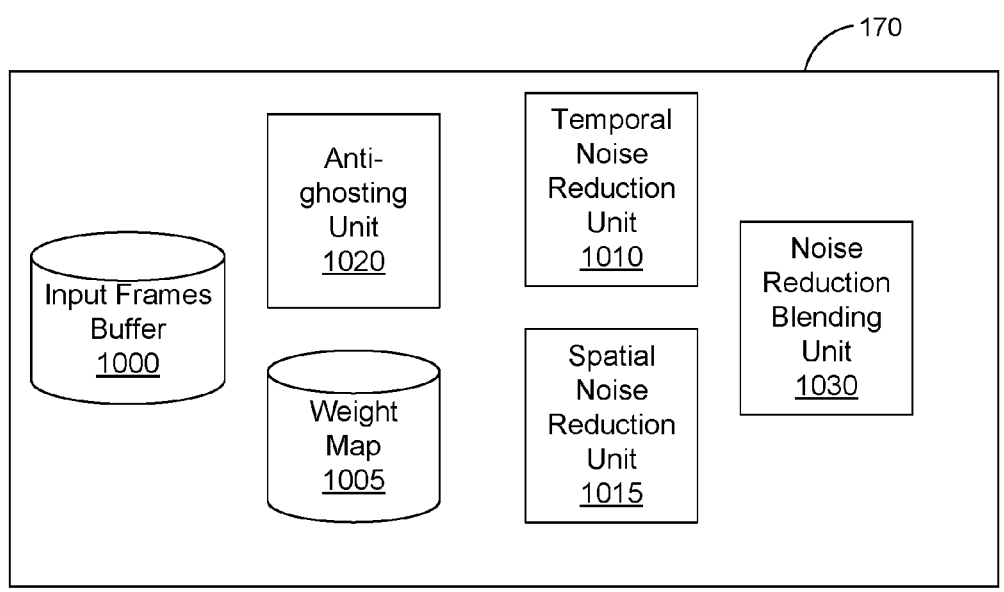
FIG. 10 illustrates an example high-level block diagram of a spatial temporal noise reduction (NR) engine, according to one embodiment.

FIG. 10 illustrates an example high-level block diagram of the spatial temporal noise reduction (NR) engine 170, according to one embodiment. In some embodiments, the spatial temporal noise reduction (NR) engine 170 is a hardware component that processes frames accessed from the microprocessor 102 or image sensor 112. The spatial temporal noise reduction (NR) engine 170 includes an input frames buffer 1000, a weight map 1005, a temporal noise reduction 1010, a spatial noise reduction unit 1015, and a noise reduction blending unit 1030. The spatial temporal noise reduction (NR) engine 170 can include different and/or additional components than those illustrated in the embodiment of FIG. 10 to perform the functionalities described herein.

The input frames buffer 1000 stores a reference image frame received from the microprocessor 102 or image sensor 112. The input frames buffer 1000 also stores one or more image frames that are temporally adjacent to the reference frame. The temporally adjacent frames are frames that were captured prior to (or subsequent to) the capturing of the reference frame. These may have been captured immediately prior to (or subsequent to) or there may have been a short period of time between the captures of these frames. For example, if the reference frame is from a captured video and is frame number X, a temporally adjacent frame may be frame number X+n or X−n, where X and n are integer values. Since the reference image frame and the temporally adjacent image frames are captured within a short period of time of one another, the scenes captured by these frames may include scene objects and captured elements that are shared among the frames. For example, the frames may be from a longer video recording, and so the reference image frame and temporally adjacent image frames may be consecutive image frames of the video capturing a particular scene.

The anti-ghosting unit 1020 determines if a ghosting artifact may exist between a portion of the reference image frame and a corresponding portion of the temporally adjacent image frames stored in the input frame buffer 1000. Both the reference image frame and the temporally adjacent image frames have noise generated from the capturing of the scene. This noise can be caused by both dark noise (noise inherent in the image sensor 112) and Poisson noise (noise due the discrete nature of photons), and may be reduced using noise reduction techniques. For example, the pixel intensity values (i.e., luminance) of the reference image frame and each of the temporally adjacent image frames may be averaged together to produce an averaged pixel intensity value result that reduces the randomly generated noise that differs from frame to frame. If four frames are averaged, the standard deviation of the noise variations in the frames is divided by two, providing an increase in the signal to noise ratio (SNR) of approximately 6 decibels (dB).

While in many temporally adjacent frames the captured image includes details which are at similar coordinate positions on the image across the frames (e.g., in the case of captured image frames of a slow moving scene), in some cases the captured scene differs significantly between two image frames (e.g., in a fast moving scene). When capturing a changing scene, one image frame may have a captured element at one coordinate position whereas the next frame may not have the same element due to the movement in the scene. When averaging such frames for noise reduction, a "ghosting" effect is observed as the pixels with the captured element are averaged with pixels without the captured element. The anti-ghosting unit 1020 determines the portions (i.e., areas of the image that are smaller than the total area of the image) of the image frames in which ghosting artifacts exist, such that a simple frame averaging is not performed on these portions.

To determine whether a ghosting artifact exists in a portion of the image frames, the anti-ghosting unit 1020 determines whether the portion of the image frames have a large change in intensity over temporally adjacent image frames (i.e., these portions appear not to be illuminated with the same amount of light). The anti-ghosting unit 1020 computes a pixel intensity value distance (i.e., a difference) between portions of the image on the reference frame and the temporally adjacent frames. If this pixel value distance exceeds a configurable statistically significant threshold, then the anti-ghosting unit 1020 determines that a ghosting artifact would occur if that portion of the image were simply frame averaged. The anti-ghosting unit 1020 also computes a weight map 1005 based on the pixel value distance for each portion of the image frames.

In one embodiment, when the anti-ghosting unit 1020 determines that the SNR of a portion of the reference image frame and/or temporally adjacent image frames is greater than a threshold level, the anti-ghosting unit 1020 determines the pixel distance value based on the absolute value of the pixel value distance normalized by the measured noise in the image frames.

However, when the anti-ghosting unit 1020 determines that the SNR of the portion of the reference image frame and/or temporally adjacent image frames is below the threshold, the anti-ghosting unit 1020 determines a pixel distance value based on a more robust spatial average (i.e., a blur) of the portion of the image. For example, the spatial average may include a 5×5 convolution kernel. The anti-ghosting unit 1020 may compensate for the loss of information due to the blur by also determining whether any high frequency changes (i.e., changes that may be detected without blur) exist in the portions of the adjacent image frames.

In one embodiment, the pixel distance value computation may be represented by the following equation:

$$\Delta_{HF} = \frac{1}{\sqrt{2} \times \sqrt{2/\pi}} \times \frac{\frac{1_{5\times5}}{5^2} * \|X_t - X_{t-1}\|}{\sigma(X_t)} \quad (9)$$

$$\Delta_{LF} = 5 \cdot \frac{1}{\sqrt{2} \times \sqrt{2/\pi}} \times \frac{1_{3\times3}}{3^2} * \frac{\left\|\frac{1_{5\times5}}{5^2} * (X_t - X_{t-1})\right\|}{\sigma(X_t)} \quad (10)$$

-continued $$\Delta = \begin{cases} \Delta_{HF} & \text{if } SNR > SNR_{limit} \\ \begin{cases} \Delta_{LF} & \text{if } \Delta_{HF} < AliasingThreshold \\ ghostDistance & \text{else} \end{cases} & \text{if } SNR < SNR_{limit} \end{cases} \quad (11)$$

The high frequency distance, $\Delta_{HF}$, is the pixel distance value computation for instances where the SNR is high and less blurring is required on the pixel values before computing the difference. The low frequency distance, $\Delta_{LF}$, represents the pixel distance value for instances where SNR is low (i.e., noisy). When the SNR is low, the distance is computed using an additional blurring step, i.e., the surrounding pixel values of each frame are averaged and the difference between these averages is measured. Note that "$1_{5\times5}$" represents a 5×5 convolution kernel (i.e., a 5×5 matrix having 1's in each position of the matrix), and that the "*" operator represents the convolution operator. $X_t$ and $X_{t-1}$ represent the pixels of the reference image frame and the temporally adjacent image frames, respectively, and $\|X_t - X_{t-1}\|$ represents the absolute value of the difference in the pixel values in the respective image frames. The lowercase sigma, $\sigma$, represents the standard deviation.

The ghostDistance value is a predetermined value representative of the likelihood of occurrence of a ghost artifact. This value is greater than the maximum threshold value for which a pixel distance value is not considered to be caused by a ghost artifact. For example, the ghostDistance may be set to 10 (i.e., if the distance is below 10 then a ghosting artifact is not indicated). The $SNR_{limit}$ is the limit at which the high frequency distance ($\Delta_{HF}$) becomes too noisy.

In one embodiment, if there are no ghosting artifacts, the normalized estimators of the standard deviation have an expected value of 1, and $E(\Delta_{HF})=1, E(\Delta_{LF})=1$.

In one embodiment, the anti-ghosting unit 1020 determines that an aliasing issue has occurred when determining the pixel value distance at a portion of the image frame when the result computed from the low frequency distance equation does not detect a significant pixel distance value difference, whereas the result computed from the high frequency distance equation does measure a difference. This may occur since the low frequency distance computation uses additional spatial averaging (blurring) against portions of the image frame, and so changes between image frames are not necessarily detected. This discrepancy triggers an anti-alias procedure with the anti-ghosting unit 1020 such that the anti-ghosting unit 1020 determines that a ghost artifact exists at that portion of the image.

In one embodiment, the anti-ghosting unit 1020 determines the weight map 1005 based on a fuzzy function:

$$FuzzyFunction = \begin{cases} 0 & \text{if } \Delta < S\max \\ \text{else} \begin{cases} 1 & \text{if } \Delta < S\min \\ \frac{\Delta - S\min}{S\max - S\min} & \text{else} \end{cases} \end{cases} \quad (12)$$

Note that Smax and Smin represent configurable thresholds for determining whether a ghosting artifact exists (e.g., a pixel distance of 5 units).

Using the fuzzy function, the weight map 1005 is determined based on the following equation:

$$Weight = \varepsilon 1_{3\times3} \left[ \frac{S\max - \Delta}{S\max - S\min} \cdot clip(1, 0) \right] \quad (13)$$

As shown, the anti-ghosting unit 1020 erodes the weight map 1005 by a 3×3 matrix to make ghost artifact detection more robust, such that if a ghost artifact is detected within the erosion area, all pixels in that area are considered to have a ghost artifact. This may be performed at the color filter array level.

The spatial noise reduction unit 1015 determines a set of spatial noise reduction values for the portions of the image frames in the input frames buffer 1000 where a ghosting artifact is detected by the anti-ghosting unit 1020. The spatial noise reduction values may be determined for a portion of the image based on an average of the surrounding pixel values of that portion of the image. In one embodiment, the spatial noise reduction unit 1015 determines the spatial denoising on the color filter array of the image sensor 112 using a monoscale non local (NL) means. The spatial noise reduction unit 1015 determines a weighted sum on the pixels of a neighborhood of an image frame that have the same phase. To compute the difference between two pixels, the spatial noise reduction unit 1015 compares local colored portions of the image frame to the estimated noise value, which is computed based on the noise model and a reference grey patch. The weighted sum is determined using the following equation:

$$\text{Weights: } \alpha_i = e^{-\frac{1}{PatchSize} \sum_{\delta \in Patch} \frac{(X_{i+\delta} - X_\delta)^2}{h\sigma(X_\delta)^2}} \quad (14)$$

$$\text{Weighted sum: } S = \frac{X_0 + K \sum_{i=1}^{neighborhood} \alpha_i X_i}{1 + K \sum_{i=1}^{neighborhood} \alpha_i} \quad (15)$$

The spatial noise reduction unit 1015 additionally modifies the weighted sum using a coefficient in order to have the spatial denoising be consistent with the temporal denoising. The spatial noise reduction unit 1015 determines the coefficient for each pixel such that the variance is substantially similar to the temporal denoising. This variance is:

$$Var(S) = \frac{1 + K^2 \sum_{i=1}^{n} \alpha_i^2}{\left(1 + K \sum_{i=1}^{n} \alpha_i\right)^2} Var(X_0) \quad (16)$$

The target for the spatial noise reduction unit 1015 is $Var(S)/Var(X_0)=1/M$, where M is the number of frames used by the temporal noise reduction unit 1010 to perform temporal noise reduction by averaging the M frames.

Furthermore, if:

$$(\Sigma_{i=1}^{n} \alpha_i)^2 > (M-1)(\Sigma_{i=1}^{n} \alpha_i^2) \quad (17)$$

then:

$$K = \frac{\sum_{i=1}^{n} \alpha_i \pm \sqrt{M} \sqrt{\left(\sum_{i=1}^{n} \alpha_i\right)^2 - (M-1)\left(\sum_{i=1}^{n} \alpha_i^2\right)}}{M \sum_{i=1}^{n} \alpha_i^2 - \left(\sum_{i=1}^{n} \alpha_i\right)^2} \quad (18)$$

Here, the choice of K is the maximum of the roots; otherwise K is 1.

The temporal noise reduction unit 1010 determines a set of temporal noise reduction values for the portions of the image frames in the input frames buffer 1000 where the anti-ghosting unit 1020 does not determine that a ghosting artifact exists. The temporal noise reduction unit 1010 determines the temporal noise reduction values by averaging the pixel intensity values at the portion of the image frame over M number of image frames.

Additionally, as the noise over multiple image frames is random (i.e., white noise), the spectrum for this noise is constant. Thus, the temporal noise reduction unit 1010 may further pass the image frames through a low-pass filter to reduce the high frequencies, reducing the visual impact of noise.

The noise reduction blending unit 1030 blends the temporal and spatial noise reduction values determined by the temporal noise reduction unit 1010 and the spatial noise reduction unit 1015 based on the weight map 1005 for one or more input image frames to output one or more final image frames with noise reduction applied. When the weight map indicates a large pixel distance value, a small or no temporal noise reduction is blended with a strong spatial noise reduction. When a small pixel distance value is indicated, a strong temporal noise reduction is blending with a small or no spatial noise reduction. This reduces the amount of blur introduced into the image frames. In one embodiment, the noise reduction blending unit 1030 blends an output image according to the following equation:

$$\text{Output} = \qquad\qquad (19)$$

$$(1-\tau) \times X_t + \tau \times \frac{X_t + \sum_{j \in N-1 \text{ frames}} \text{weight}_j \times X_{t-j} + \left(N - 1 - \sum_{j \in N-1 \text{ frames}} \text{weight}_j\right) \times S}{N}$$

Here, N represents the total number of image frames that are used for the noise reduction, and weight is based on the weight map 1005 computations from Eq. (13). τ is the blending coefficient and S are spatial noise reduction values from Eq. (13).

Example Process for Spatial Temporal Noise Reduction

Figure 11:
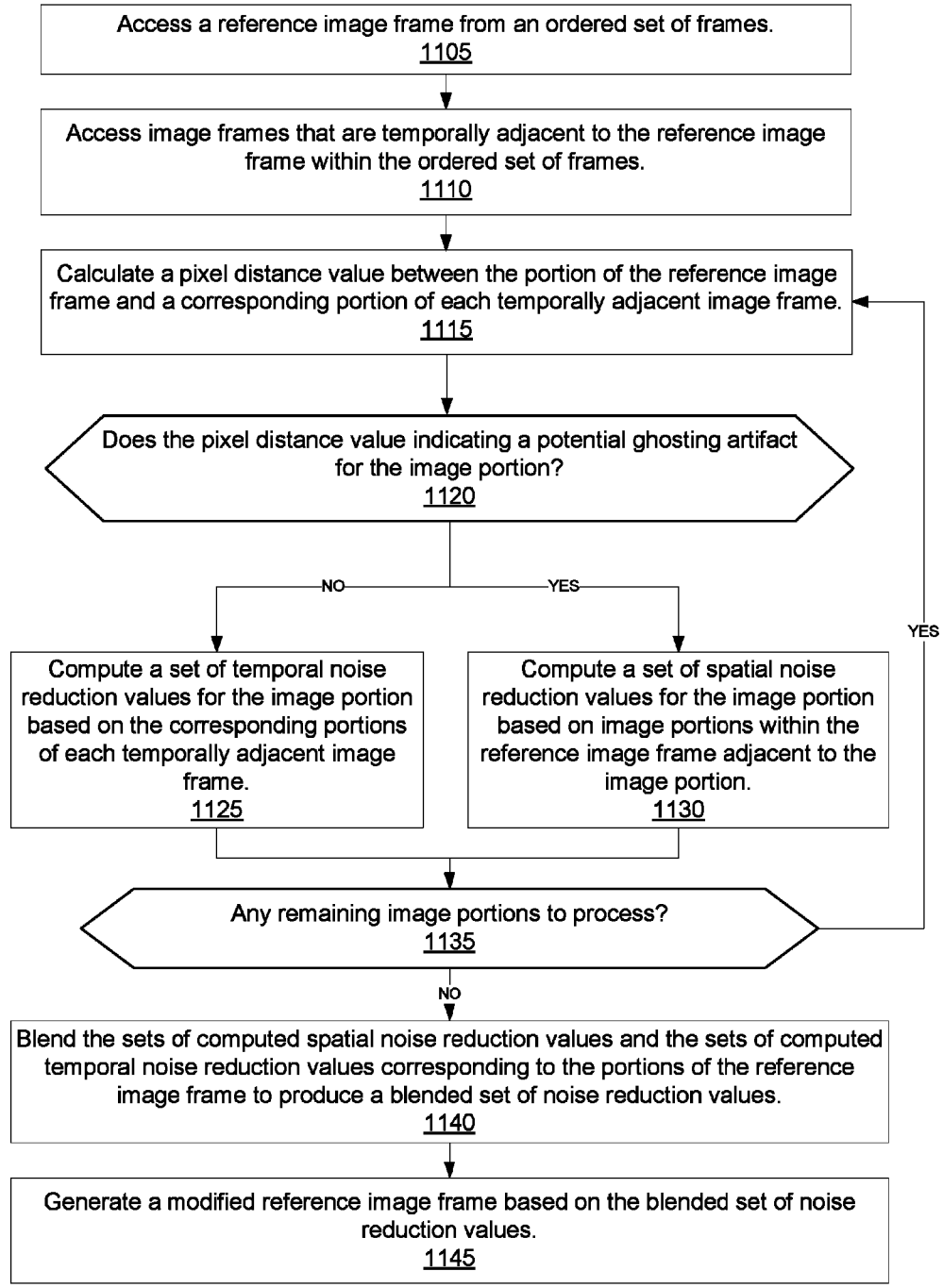
FIG. 11 illustrates a method for spatial temporal noise reduction in one or more image frames, according to one embodiment.

FIG. 11 illustrates a method for spatial temporal noise reduction in one or more image frames, according to one embodiment. In other embodiments, the method includes different, additional, or fewer steps than those depicted by FIG. 11. Additionally, in some embodiments, the steps described in conjunction with FIG. 11 may be performed in different orders.

Initially, the spatial temporal NR engine 170 accesses 1105 a reference image frame from an ordered set of frames, and also accesses 1110 image frames that are temporally adjacent to the reference image frame within the ordered set of frames.

The spatial temporal NR engine 170 calculates 1115 a pixel distance value between the portion of the reference image frame and a corresponding portion of each temporally adjacent image frame. In one embodiment, this may be performed by the anti-ghosting unit 1020 using the methods described above.

The spatial temporal NR engine 170 determines 1120 whether the pixel distance value indicates a potential ghosting artifact for the image portion. The spatial temporal NR engine 170 may determine the pixel distance value in the process described above and generate a weight map based on the determined pixel distance value.

If no ghosting artifact is indicated, the spatial temporal NR engine 170 computes 1125 a set of temporal noise reduction values for the image portion based on the corresponding portions of each temporally adjacent image frame. In one embodiment, the spatial temporal NR engine 170 determines temporal noise reduction values by averaging portions of temporally adjacent frames.

If a ghosting artifact is indicated, the spatial temporal NR engine 170 computes 1130 a set of spatial noise reduction values for the image portion based on image portions within the reference image frame adjacent to the image portion. In one embodiment, the spatial temporal NR engine 170 determines the set of spatial noise reduction values in the manner described above.

The spatial temporal NR engine 170 determines 1135 if additional portions of the image frames remain to be processed. If so, the spatial temporal NR engine 170 continues execution at block 1115. Otherwise, the spatial temporal NR engine 170 blends 1140 the sets of computed spatial noise reduction values and the sets of computed temporal noise reduction values corresponding to the portions of the reference image frame to produce a blended set of noise reduction values. In one embodiment, the spatial temporal NR engine 170 blends the noise reduction values according to the blending operation described above.

Based on the blended set of noise reduction values, the spatial temporal NR engine 170 generates 1145 a modified reference image frame. This modified reference image frame has noise reduction applied to it by the spatial temporal NR engine 170.

Global Tone Mapping

Figure 12:
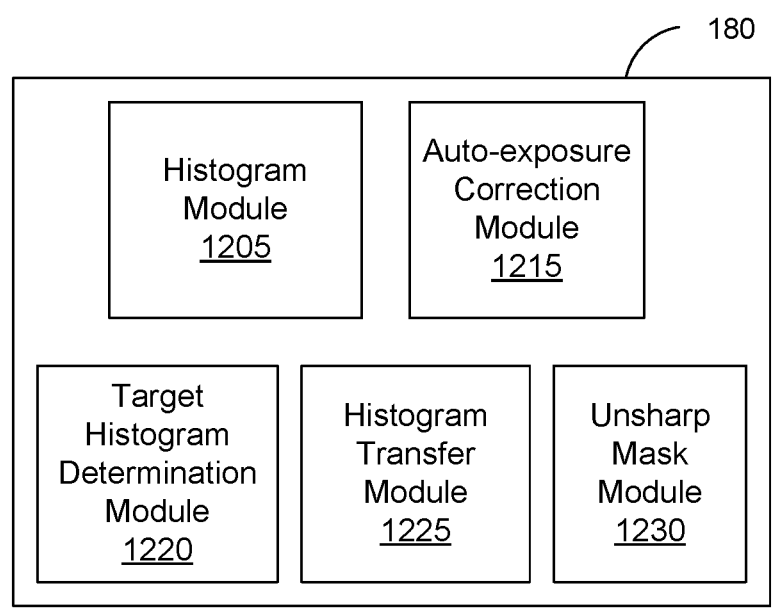
FIG. 12 illustrates an example high-level block diagram of a global tone mapper, according to one embodiment.

FIG. 12 illustrates an example high-level block diagram of the global tone mapper 180, according to one embodiment. In some embodiments, the global tone mapper 180 is a hardware component that processes images accessed from the microprocessor 102 or image sensor 112. The global tone mapper 180 includes a histogram module 1205, an auto-exposure correction module 1215, a target histogram determination module 1220, a histogram transfer module 1225, and an unsharp mask module 1230. The global tone mapper 180 can include different and/or additional components than those illustrated in the embodiment of FIG. 12 to perform the functionalities described herein.

The histogram module 1205 computes histograms for the accessed image and also determines a blackpoint to be applied to the image based on the histogram. The histogram module 1205 may also determine whether the pixel values (e.g., red, green, and blue color values) of the image are in the linear domain. The image may not be in the linear domain when a gamma curve has been applied, or if the range of pixel values of the image have been compressed non-linearly to fit the color space. If the values are not in the linear domain, the histogram module 1205 may convert the pixel values (back) to the linear domain. The histogram module 1205 computes three histograms for each color channel of the image. The histogram module 1205 uses these three color histograms to estimate blackpoints per channel and to apply the blackpoints to the image such that only a given percentage of the resulting pixels on each channel are black (e.g., 0.1%).

The histogram module 1205 also computes a luminance (grey level) histogram of the image based on the luminance of the image. The luminance of the image is determined based on a luminance function that attempts to match the sensitivity of a human eye towards the three different primary colors. In one embodiment, the histogram module 1205 determines that the luminance of the image using the following luminance function:

$$Y(R,G,B)=0.3R+0.55G+0.15B \qquad (20)$$

Here, R, G, and B are the color intensity values at a pixel for red, green, and blue, respectively. Note that green is further emphasized in the luminance function as the human eye is more sensitive to green rather than red or blue light. Once the histogram module 1205 computes the luminance values of the image using the luminance function, the histogram module 1205 determines the luminance histogram for the image. In one embodiment, in order to increase the lighting effect on small details, the histogram module 1205 applies a 5×5 box filter to the image.

The auto-exposure correction module 1215 corrects the image for any undesired auto-exposure. The image may have been over- or under-exposed during capture by the camera 100. In particular, the auto-exposure mechanism of the camera 100 may have underexposed the region of interest of the image in order to preserve the highlights in the image such that the highlight areas stay with the dynamic range of the camera 100.

In one embodiment, to compensate for these exposure errors, the auto-exposure correction module 1215 uses a look up table (LUT) that provides corrected output luminance values for input luminance values without clipping highlight information. The LUT is generated based on a tone curve generated by concatenating a linear curve and a Bezier curve. The slope of the linear curve is based on the amplification to apply to the image to better expose the relevant regions of interest (ROI). This slope may be equal to an exposure bias of 2 ev (2 stops). The Bezier curve portion is based on the following equation:

$$aec(x) = \begin{cases} sx & \text{if } sx < \rho \\ B(x) & \text{if } x \geq \rho \end{cases} \qquad (21)$$

Figure 14A:
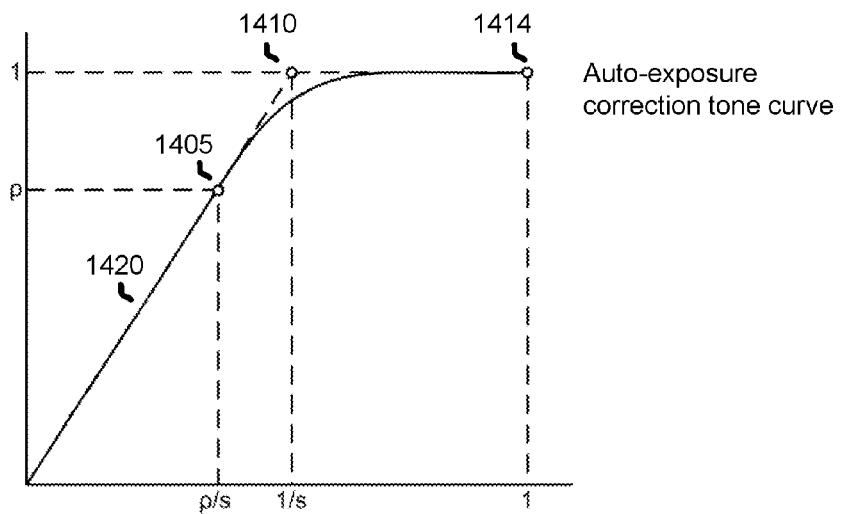
FIG. 14A illustrates an example of an auto-exposure correction tone curve, with three control points, according to an embodiment.

Here, B is a cubic Bezier curve defined by the three control points $P_0=[\rho/s,\rho]_r$, $P_1=[1/s,1]_r$, and $P_2=[1,1]_r$. FIG. 14A illustrates an example of such a curve 1420, with the three points 1405, 1410, and 1414, according to one embodiment. Note that the curve provides a linear scale of values but tapers off smoothly near that maximum saturation point to avoid clipping values. The curve may be represented parametrically by:

$$B(t)=\rho_{i=0}^n \binom{n}{i}(1-t)^{n-i}t^i P_i, t\in[0,1] \qquad (22)$$

In particular, for the quadratic Bezier curve:

$$B(t)=(1-t)^2 P_0+2t(1-t)P_1+t^2 P_2, t\in[0,1] \qquad (23)$$

Using interpolation, the parametric equation may be converted to Cartesian space.

The auto-exposure correction module 1215 uses the LUT generated from the tone curve to apply the tone curve to the luminance intensity values of the image. In one embodiment, the auto-exposure correction module 1215 applies the tone curve to the original image, and then the histogram module 1205 determines the luminance values and luminance histogram of the image in the post-tone curve space.

Referring back to FIG. 12, the target histogram determination module 1220 determines a target histogram for the image that enhances the global contrast of the image. The image is to be modified such that the modified image has as its histogram the target histogram.

In one embodiment, the target histogram determination module 1220 automatically selects a target histogram that achieves the most optimal contrast of all ROI in the image. These may include a flat histogram (enhancing the contrast overall), or a parabolic histogram (enhancing shadows and highlights). The target histogram determination module 1220 may analyze the auto-exposure corrected luminance histogram to determine those areas which are not significantly represented in the image and select a target histogram that enhances these areas. In one embodiment, the target histogram determination module 1220 allows the user to select a target histogram. The target histogram determination module 1220 may present to the user an estimated preview of how the histogram would affect the image.

Figure 14B:
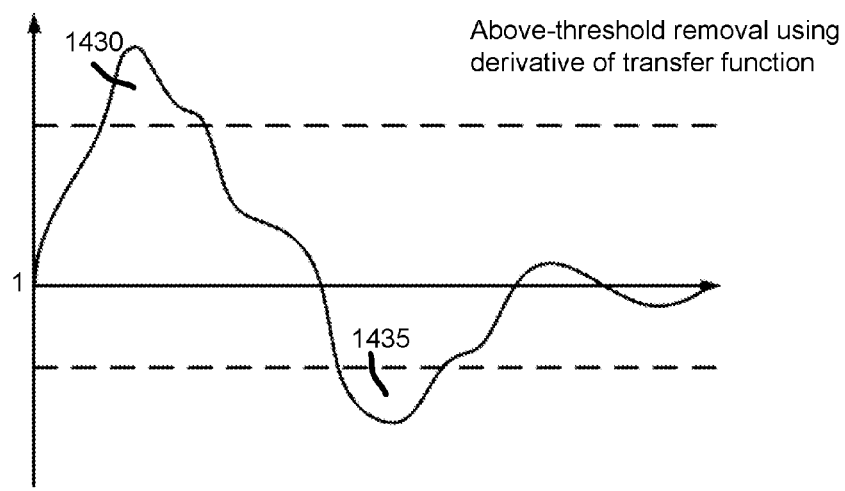
FIG. 14B illustrates an exemplary derivative of a transfer function for performing high and low threshold clipping, according to one embodiment.
Figure 14C:
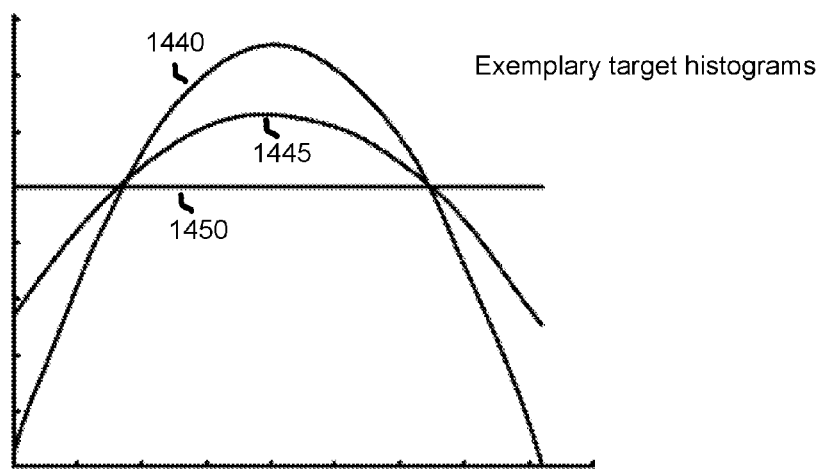
FIG. 14C illustrates an exemplary set of target histograms, according to one embodiment.

FIG. 14C illustrates an exemplary set of target histograms, such as a flat histogram 1450 and two parabolic histograms 1445 and 1440. Note that these are representations of ideal continuous histograms, and in practice as the pixel counts in an image are discrete, the actual histogram of the modified image only approximates the ideal histogram.

Referring back to FIG. 12, the histogram transfer module 1225 modifies the image such that it matches the target histogram determined by the target histogram determination module 1220. To accomplish this, the histogram transfer module 1225 first determines a transfer function that converts the luminance values of the auto-exposure corrected image into a target image that has as its histogram the target histogram.

Figure 13:
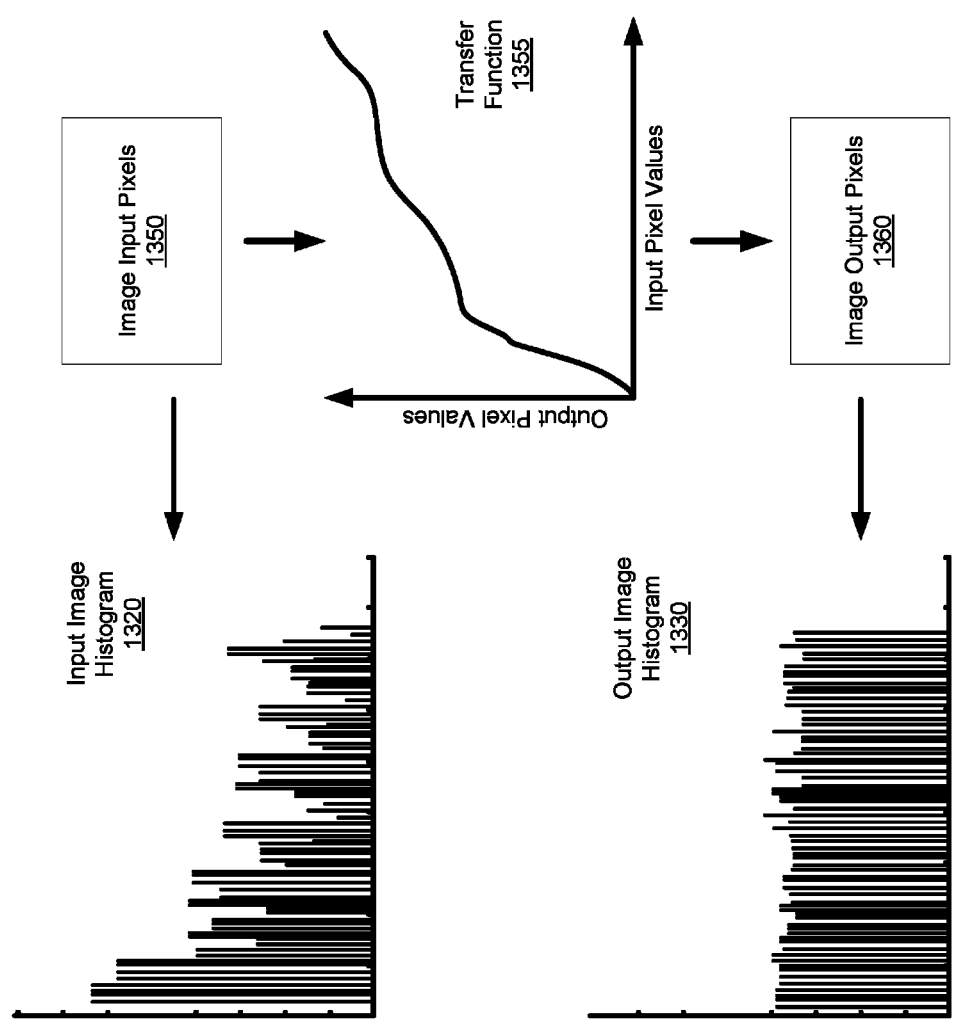
FIG. 13 illustrates an exemplary process of implementing a transfer function to convert input pixels to output pixels such that the histogram of the output image matches a target histogram that is a flat histogram, according to an embodiment.

FIG. 13 illustrates an exemplary diagram of a transfer function 1355 to convert input pixels 1350 to output pixels 1360 such that the histogram 1330 of the output image matches a target histogram that is a flat histogram. In one embodiment, in order to convert the image such that it reaches the output image histogram 1330, the histogram transfer module 1225 determines a first cumulative distribution using the histogram 1320 of the input image. The cumulative distribution counts, at each intensity level, the number of pixels at that intensity level in the image along with the number of pixels with intensity levels below that intensity level. The first cumulative distribution, when applied to the pixels of the image, generates an image with a flat histogram. The histogram transfer module 1225 may also take the target histogram and generate a second cumulative function based on that target histogram. Note that the target histogram may be modified by the histogram transfer module 1225 to have the same area as the histogram 1320 of the original luminance image. The histogram transfer module 1225 then combines the first cumulative distribution with the inverse of the second cumulative distribution to generate the transfer function 1355. In other embodiments, different methods are used to determine the transfer function between two histograms.

Note that after applying the transfer function in FIG. 13, the output image histogram 1330 is not perfectly flat. This is due to the fact that the pixel counts and values are discrete and not continuous, and thus rounding and other quantization effects may affect the result.

In one embodiment, in order to avoid large magnifications of dark areas in the luminance values by the transfer function, thus leading to unwanted amplification of noise, the histogram transfer module 1225 regularizes the derivative of the transfer function by constraining the derivative of the transfer function. FIG. 14B illustrates an exemplary derivative of a transfer function. A low threshold and a high threshold (e.g., ThLow and ThHigh) are specified. These indicate the minimum and maximum of the derivative. The regions of the derivative function exceeding these thresholds are indicated by the regions 1430 and 1435 that are above and below the dotted lines in FIG. 14B. The histogram transfer module 1225 determines which one of the areas is the smaller region and increases the area of this smaller region until it matches (or substantially matches within a specific range) the area of the larger region. The histogram transfer module 1225 clips the two regions from this modified derivative function, and integrates (and smooths) the derivative function to generate the regularized transfer function. The purpose of equalizing the two regions is so that the number of pixels is preserved when integrating the clipped derivative.

After computing the transfer function, in one embodiment, the histogram transfer module 1225 transposes the transfer function to a color space where a gamma curve of the image has not yet been applied. Given the transfer function $T(x)$, in one embodiment the transposed transfer function $T'(x)=TC^{-1}(T(TC(x)))$, where TC is the gamma curve. The histogram transfer module 1225 applies a gain based on the transposed transfer function to the color values of the image. This new gain is defined as $g_{final}(x)=(g(T_{aec}(x))*g_{aec}(x)$, where $T_{aec}$ is the auto-exposure adjustment curve and $g_{aec}(x)*x=T_{aec}(x)$. In one embodiment, the auto-exposure adjustment is not performed, and so the histogram transfer module does not transpose the transfer function and applies it to the image as $x'=x*g(Y(R, G, B))$, where x is one of R, G or B channels, Y is the luminance function of the given pixel, and $g(x)=T'(x)/x$. The histogram transfer module 1225 may convert the image with the gain applied back to the sRGB color space by applying the gamma curve to it. In one embodiment, the histogram transfer module 1225 further modifies (e.g., by multiplication) the gain of the transposed transfer function based on the transfer function computed for the prior frame (i.e., a temporal filter is applied). The histogram transfer module 1225 may also apply a spatial 5×5 filter on the gain map. Prior to applying the spatial 5×5 filter, the gain $g(Y(x))$ may be filtered to enhance small details.

In one embodiment, if the input image is uniform (e.g., a whiteboard), it would be undesirable to enhance the contrast of dust or other artifacts in the image. Thus, the histogram transfer module 1225 detects the uniformity of the image and reduces the strength of the applied transfer function. In one embodiment, to determine the uniformity of an image, the histogram transfer module 1225 generates a thumbnail image of the luminance of the image. The histogram transfer module 1225 computes a gradient on a portion of the image to determine whether the portion is uniform or not. The histogram transfer module 1225 computes a cumulative histogram of the gradients of the image, and compares the inverse image of the median (0.5) of the cumulative histogram to two thresholds, which represent the minimum and maximum values in the image. If the histogram transfer module 1225 determines that the image is uniform, the histogram transfer module 1225 applies a smaller gain to the image. If the image is not uniform, the histogram transfer module 1225 applies the default gain from the transfer function. In a third case, the histogram transfer module 1225 applies a gain that is a linear interpolation between the default gain and the uniform gain.

Referring back to FIG. 12, the unsharp mask module 1230 corrects for tone mapping in smaller portions of the image. The unsharp mask module 1230 segments the image based on regions that are compressed by the gain from the transfer function and the regions that are amplified by the gain from the transfer function. In other words, the unsharp mask module 1230 compares the curve of the final gain applied to the image with an ideal exposure curve identified by an evBias parameter in order to determine the actual compression compared to a digital gain. The unsharp mask module 1230 normalizes the gain by a predefined maximum value in both the compression and amplification regions. These regions are then multiplied by predefined amplification and compression parameters to generate the localized contrast change.

In some embodiments, the global tone mapper 180 applies the process described above to the image with a precision equal to or great than 12 bits in order to avoid quantization effects. Additionally, for the autoexposure gain LUT, the output range is at least a 12 bit signal with a 7 bit decimal portion and a 5 bit integer portion. The input precision depends on the type of LUT that is implemented in the pipeline of the global tone mapper 180. For the type of LUT, since the LUT is applied using a piece-wise linear function defined by (n+1) control points, if all control points are equidistant, n is be greater or equal to $2^7$. However, in the linear domain, the maximum precision is only needed in dark areas. Thus, the distance between two control points can be increased in the highlight regions in order to reduce the number of parameters to be specified within the hardware and to increase the precision.

Exemplary Process for Global Tone Mapping

Figure 15:
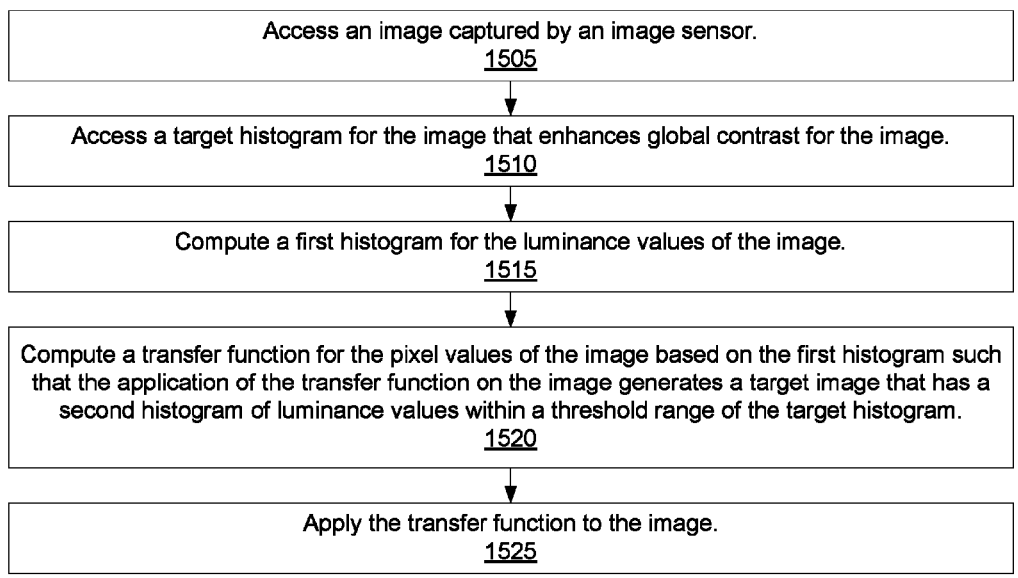
FIG. 15 illustrates a method for applying global tone mapping to an image, according to one embodiment.

FIG. 15 illustrates a method for global tone mapping, according to one embodiment. In other embodiments, the method includes different, additional, or fewer steps than those depicted by FIG. 15. Additionally, in some embodiments, the steps described in conjunction with FIG. 15 may be performed in different orders.

Initially, the global tone mapper 180 accesses 1505 an image captured by an image sensor. As noted above, the global tone mapper 180 may convert the pixel values of the image into the linear domain.

The global tone mapper 180 also accesses 1510 a target histogram for the image that enhances global contrast for the image. In some cases, this may be a flat histogram, or a parabolic histogram.

The global tone mapper 180 computes 1515 a first histogram for the luminance values of the image. The luminance values of the image may be based on a luminance function as described above.

In one embodiment, the global tone mapper 180 generates the target histogram for the image based on the first histogram for the luminance values of the image. In such an embodiment, the global tone mapper 180 accesses the generated target histogram after computing 1515 the first histogram.

The global tone mapper 180 computes 1520 a transfer function for the pixel values of the image based on the first histogram such that the application of the transfer function on the image generates a target image that has a second histogram of luminance values within a threshold range of the target histogram. In one embodiment, the global tone mapper 180 computes the transfer function based on the luminance values of an auto-exposure tone curve corrected version of the image as described above.

After computing the transfer function, the global tone mapper 180 applies 1525 the gain relative to the previously estimated transfer function to the image. After applying the gain, the global contrast of the image is enhanced. This provides for an image that is more pleasing to the eye, and more fully utilizes the full dynamic range available for the image. Then, a local tone mapping (an unsharp mask for instance) may also be applied on the image to further enhance the local contrast.

Additional Configuration Considerations

Certain embodiments are described herein as including logic or a number of components, modules, or mechanisms, for example, as illustrated in FIGS. 2 and 3. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context. Further, unless expressly stated to the contrary, "or" refers to an inclusive or and not to an exclusive or.

Upon reading this disclosure, those of skill in the art will appreciate still additional alternative structural and functional designs for a system and a process for processing image data through the disclosed principles herein. Thus, while particular embodiments and applications have been illustrated and described, it is to be understood that the disclosed embodiments are not limited to the precise construction and components disclosed herein. Various apparent modifications, changes and variations may be made in the arrangement, operation and details of the method and apparatus disclosed herein without departing from the spirit and scope defined in the appended claims.

What is claimed is:

1. A method for generating a scaled image captured by a camera comprising:
   identifying a scaling position in a captured image, the captured image comprising an array of subpixels;
   identifying a first set of red subpixels within the captured image adjacent to the identified scaling position;
   computing a scaled red subpixel value at the scaling position based on values of the first set of red subpixels and the distance of each of the first set of red subpixels to the identified scaling position, the scaled red subpixel value computed such that an amount of noise and an amount of blur corresponding to the scaled red subpixel value are within a threshold of an amount of noise and amount of blur, respectively, corresponding to the first set of red subpixels;
   identifying a second set of blue subpixels within the captured image adjacent to the identified scaling position;
   computing a scaled blue subpixel value at the scaling position based on values of the second set of blue subpixels and the distance of each of the first set of blue subpixels to the identified scaling position, the scaled blue subpixel value computed such that an amount of noise and an amount of blur corresponding to the scaled blue subpixel value are within a threshold of an amount of noise and amount of blur, respectively, corresponding to the second set of blue subpixels;
   identifying a third set of green subpixels within the captured image adjacent to the identified scaling position, the third set of green subpixels including Gr and Gb green subpixels;
   computing a scaled green subpixel value at the scaling position based on values of the third set of green subpixels and the distance of each of the third set of green subpixels to the identified scaling position, the scaled green subpixel value computed such that an amount of noise and an amount of blur corresponding to the scaled green subpixel value are within a threshold of an amount of noise and amount of blur, respectively, corresponding to the third set of green subpixels, and such that an imbalance in values between the Gr and Gb green subpixels of the third set of green subpixels is within a threshold of imbalance; and
   generating a scaled image representative of the captured image, the scaled image including at least the scaled red subpixel value, the scaled blue subpixel value, and the scaled green subpixel value.

2. The method of claim 1, wherein identifying a scaling position in a captured image further comprises:
   identifying a point at any location on the plane of the captured image; and
   selecting the identified point as the scaling position.

3. The method of claim 1, wherein identifying the first set of red subpixels further comprises:
   identifying as the first set of red subpixels a grid of three by three red subpixels including the scaling position within the grid of three by three red subpixels.

4. The method of claim 3, wherein computing the scaled red subpixel value at the scaling position further comprises:
   associating three row coefficients with each row of the grid of three by three red subpixels;
   associating three column coefficients with each column of the grid of red subpixels;

associating, for each red subpixel in the grid of red subpixels, a pair of coefficients including a row coefficient and a column coefficient corresponding to the row and column position of the red subpixel in the grid of red subpixels;

determining the value of the three row coefficients and the three column coefficients by solving for each coefficient based on a set of first constraints; and determining the value of the scaled red subpixel at the scaling position by summing the values of each red subpixel in the first set of red subpixels modified by the corresponding pair of coefficients.

5. The method of claim 1, wherein identifying the second set of blue subpixels further comprises:

identifying as the second set of blue subpixels a grid of three by three blue subpixels including the scaling position within the grid of three by three blue subpixels.

6. The method of claim 1, wherein identifying a third set of green subpixels further comprises:

identifying as the third set of green subpixels a set of eight green subpixels within a grid of four by four subpixels surrounding the scaling position, the scaling position bounded by the two centrally located green subpixels within the grid of four by four subpixels.

7. The method of claim 6, wherein computing the scaled green subpixel value at the scaling position further comprises:

associating four row coefficients with each row of the grid of four by four subpixels (the grid of subpixels);

associating four column coefficients with each column of the grid of subpixels;

associating, for each green subpixel in the grid of subpixels, a pair of coefficients including a row coefficient and a column coefficient corresponding to the row and column position of the green subpixel in the grid of subpixels;

determining the value of the four row coefficients and the four column coefficients by solving for each coefficient based on a set of third constraints; and determining the value of the scaled green subpixel at the scaling position by summing the values of each green subpixel in the third set of green subpixels modified by the corresponding pair of coefficients.

8. The method of claim 1, wherein generating a scaled image representative of the captured image further comprises:

computing additional red, green, and blue scaled subpixel values for a plurality of scaling positions of the captured image; and generating a scaled image including a plurality of full color values computed at each of the plurality of scaling positions computed using the component red, green, and blue scaled subpixel values.

9. A specially-configured hardware system for generating a scaled image configured to:

identify a scaling position in a captured image, the captured image comprising an array of subpixels;

identify a first set of red subpixels within the captured image adjacent to the identified scaling position;

compute a scaled red subpixel value at the scaling position based on values of the first set of red subpixels and the distance of each of the first set of red subpixels to the identified scaling position, the scaled red subpixel value computed such that an amount of noise and an amount of blur corresponding to the scaled red subpixel value are within a threshold of an amount of noise and amount of blur, respectively, corresponding to the first set of red subpixels;

identify a second set of blue subpixels within the captured image adjacent to the identified scaling position;

compute a scaled blue subpixel value at the scaling position based on values of the second set of blue subpixels and the distance of each of the first set of blue subpixels to the identified scaling position, the scaled blue subpixel value computed such that an amount of noise and an amount of blur corresponding to the scaled blue subpixel value are within a threshold of an amount of noise and amount of blur, respectively, corresponding to the second set of blue subpixels;

identify a third set of green subpixels within the captured image adjacent to the identified scaling position, the third set of green subpixels including Gr and Gb green subpixels;

compute a scaled green subpixel value at the scaling position based on values of the third set of green subpixels and the distance of each of the third set of green subpixels to the identified scaling position, the scaled green subpixel value computed such that an amount of noise and an amount of blur corresponding to the scaled green subpixel value are within a threshold of an amount of noise and amount of blur, respectively, corresponding to the third set of green subpixels, and such that an imbalance in values between the Gr and Gb green subpixels of the third set of green subpixels is within a threshold of imbalance; and generate a scaled image representative of the captured image, the scaled image including at least the scaled red subpixel value, the scaled blue subpixel value, and the scaled green subpixel value.

10. The specially-configured hardware system of claim 9, further configured to:

identify a point at any location on the plane of the captured image; and select the identified point as the scaling position.

11. The specially-configured hardware system of claim 9, further configured to:

identify as the first set of red subpixels a grid of three by three red subpixels including the scaling position within the grid of three by three red subpixels.

12. The specially-configured hardware system of claim 11, further configured to:

associate three row coefficients with each row of the grid of three by three red subpixels;

associate three column coefficients with each column of the grid of red subpixels;

associate, for each red subpixel in the grid of red subpixels, a pair of coefficients including a row coefficient and a column coefficient corresponding to the row and column position of the red subpixel in the grid of red subpixels;

determine the value of the three row coefficients and the three column coefficients by solving for each coefficient based on a set of first constraints; and determine the value of the scaled red subpixel at the scaling position by summing the values of each red subpixel in the first set of red subpixels modified by the corresponding pair of coefficients.

13. The specially-configured hardware system of claim 9, further configured to:

identify as the second set of blue subpixels a grid of three by three blue subpixels including the scaling position within the grid of three by three blue subpixels.

14. The specially-configured hardware system of claim 9, further configured to:
identify as the third set of green subpixels a set of eight green subpixels within a grid of four by four subpixels surrounding the scaling position, the scaling position bounded by the two centrally located green subpixels within the grid of four by four subpixels.

15. The specially-configured hardware system of claim 14, further configured to:
associate four row coefficients with each row of the grid of four by four subpixels (the grid of subpixels);
associate four column coefficients with each column of the grid of subpixels;
associate, for each green subpixel in the grid of subpixels, a pair of coefficients including a row coefficient and a column coefficient corresponding to the row and column position of the green subpixel in the grid of subpixels;
determine the value of the four row coefficients and the four column coefficients by solving for each coefficient based on a set of third constraints; and
determine the value of the scaled green subpixel at the scaling position by summing the values of each green subpixel in the third set of green subpixels modified by the corresponding pair of coefficients.

16. The specially-configured hardware system of claim 9, further configured to:
compute additional red, green, and blue scaled subpixel values for a plurality of scaling positions of the captured image; and
generate a scaled image including a plurality of full color values computed at each of the plurality of scaling positions computed using the component red, green, and blue scaled subpixel values.

* * * * *